United States Patent
Lewis et al.

(10) Patent No.: US 7,567,879 B2
(45) Date of Patent: Jul. 28, 2009

(54) CIRCUIT FOR DRIVING A PLANT SUCH AS A MECHANICAL BEAM SCANNER AND RELATED SYSTEM AND METHOD

(75) Inventors: John R. Lewis, Bellevue, WA (US); William Standing, Kirkland, WA (US); Gary Mansouri, Bothell, WA (US); Tze Siu, Seattle, WA (US); Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 400 days.

(21) Appl. No.: 11/266,584

(22) Filed: Nov. 2, 2005

(65) Prior Publication Data

US 2006/0265163 A1    Nov. 23, 2006

(51) Int. Cl.
G01D 18/00    (2006.01)
G01D 21/00    (2006.01)

(52) U.S. Cl. .............................. 702/85; 700/63; 250/234

(58) Field of Classification Search .................... 702/41, 702/71–75, 105–106, 158–159, 85; 700/44–45, 700/61, 63, 253–254; 250/234–236; 359/212–213, 359/212.1, 212.2, 213.1
See application file for complete search history.

(56) References Cited

U.S. PATENT DOCUMENTS 5,796,222 A * 8/1998 Grodevant .................. 318/119
6,055,317 A * 4/2000 Muramatsu et al. ......... 381/71.4
6,164,134 A * 12/2000 Cargille .................... 73/504.02
6,889,903 B1 * 5/2005 Koenck ................. 235/462.01
7,064,876 B2 * 6/2006 Cannon et al. .............. 359/204

* cited by examiner

Primary Examiner—Eliseo Ramos Feliciano
Assistant Examiner—Mary C Baran
(74) Attorney, Agent, or Firm—Kevin D. Wills

(57) ABSTRACT

A device for driving a plant such as a beam scanner includes a memory, drive-signal generator, and a calibrator. The memory stores data corresponding to the drive signal, and the generator generates the drive signal from the data and couples the drive signal to the plant. The calibrator measures a response of the plant to the drive signal, calculates a difference between the measured response and a corresponding target response, and reduces the difference by altering the drive signal. Such a device can force the output response of the driven plant to equal a target output response, or to be sufficiently close to the target response for a particular application, while the device is operating in an open-loop configuration. Furthermore, while operating in an open-loop configuration, such a device often has a greater stability margin and greater noise immunity than a comparable device that operates in a closed-loop configuration.

27 Claims, 21 Drawing Sheets

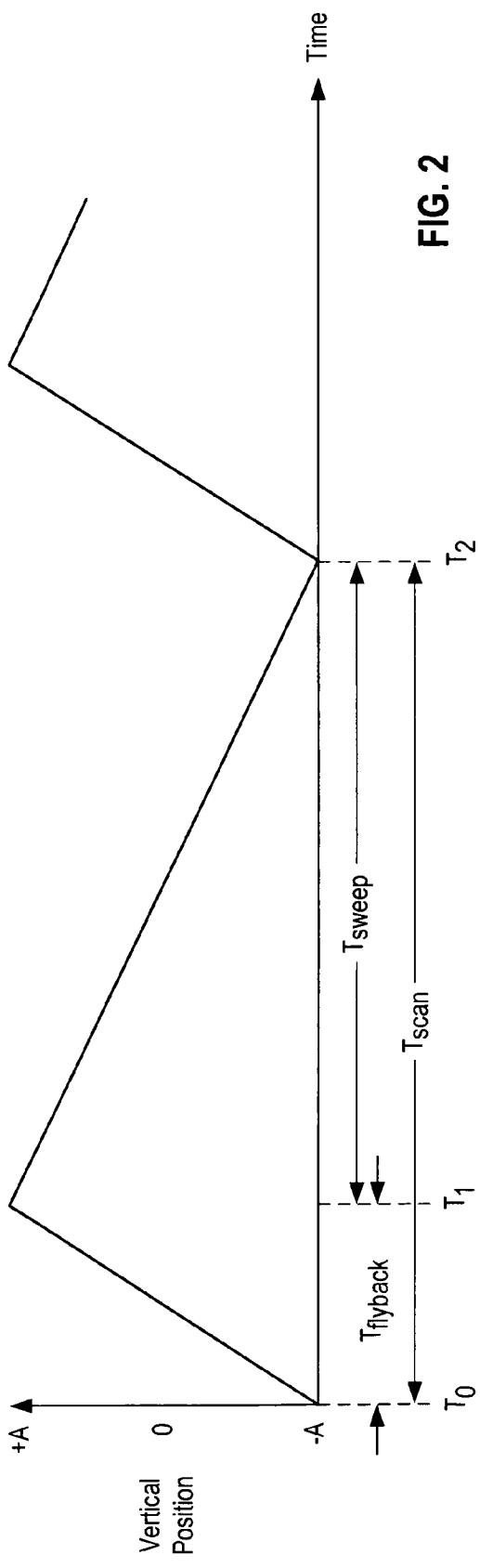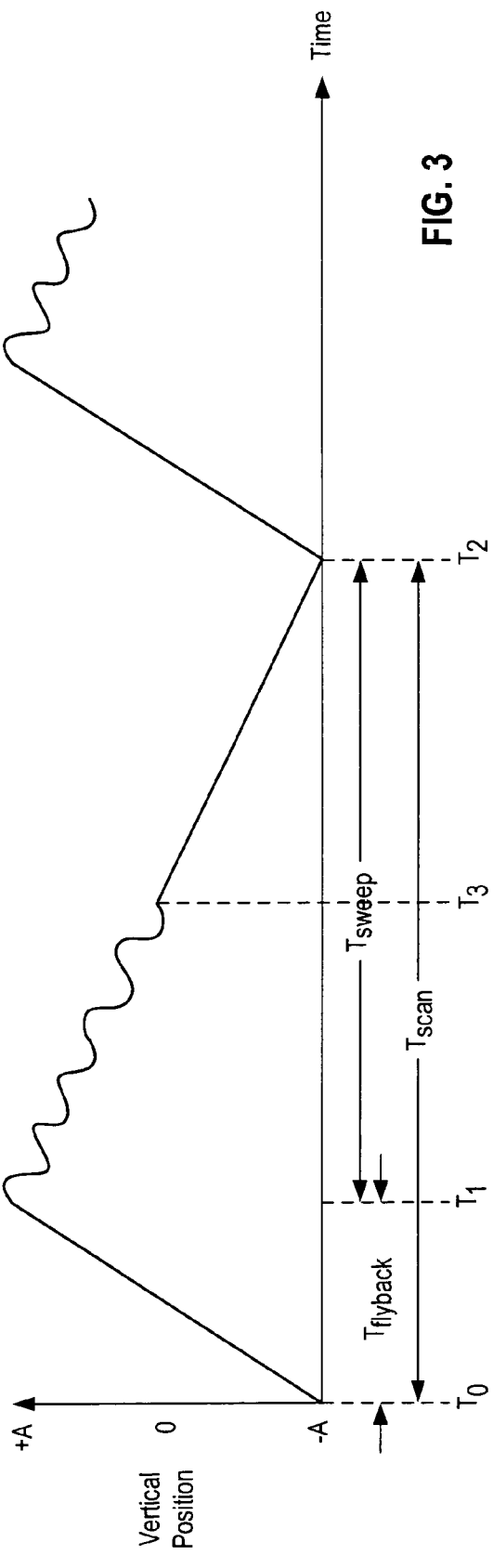

CIRCUIT FOR DRIVING A PLANT SUCH AS A MECHANICAL BEAM SCANNER AND RELATED SYSTEM AND METHOD

BACKGROUND

A control system typically drives a controlled system, i.e., a plant, such that the plant responds in a desired manner; the response of the plant is often called the plant's output response. For example, an elevator-control system typically drives an elevator motor such that the attached elevator accelerates and decelerates smoothly and stops without oscillation and with its floor even with the lobby floor. Also, a cruise-control system controls the engine of an automobile such that the automobile accelerates or decelerates smoothly and without oscillation to a preset speed and then maintains the preset speed.

Negative feedback is a popular control-system topology that forces a plant to have a desired output response. A first order negative-feedback control system, also known as a closed-loop control system, generates a negative-feedback signal having a magnitude that is related to the magnitude of the plant's actual output response and having a phase that is opposite to—ideally 180° out of phase with—the phase of the input signal. The control system typically sums the negative-feedback signal with the input signal to generate a signal for driving the plant. The difference between the plant's actual and desired output responses is the system error, and the negative-feedback signal operates to reduce the system error toward zero and to below a predetermined threshold. How close to zero the negative-feedback signal can reduce the system error is inversely proportional to the closed-loop gain of the control system. Furthermore, the speed at which the negative feedback signal can reduce the system error to below the predetermined threshold is proportional to the closed-loop bandwidth of the control system. For example, suppose that when an automobile is traveling at 60 miles per hour (MPH) a driver engages the cruise-control system and sets the cruise speed to 70 MPH. Because the actual speed of 60 MPH is 10 MPH less than the desired speed of 70 MPH, the error is −10 MPH, and the negative-feedback signal causes the automobile to accelerate to 70 MPH. As the speed of the automobile increases above 60 MPH, the error decreases. When the error decreases to within a predetermined error range, such as ±1 MPH, the negative-feedback signal causes the automobile to maintain its speed within corresponding predetermined range, such as 69-71 MPH. The predetermined error range is inversely proportional to the control system's close-loop gain, and the time that the negative-feedback control system requires to accelerate the speed of the automobile from 60 MPH to 70 MPH is proportional to the control-system's closed-loop bandwidth. That is, a designer can reduce the predetermined error range by increasing the closed-loop gain of the negative-feedback control system and can increase the rate of acceleration by increasing the closed-loop bandwidth of the control system. But if a designer increases the closed-loop bandwidth or gain too much, then the negative-feedback control system will be unstable and will cause the speed of the automobile to oscillate.

FIG. 1 is a plan view of a conventional microelectromechanical scanning-mirror (MEMS) assembly 10, which includes a reflector 12, vertical-sweep torsion arms 16a and 16b, horizontal-sweep torsion arms 18a and 18b, and a base 20 to which the vertical-sweep torsion arms are anchored. The reflector 12 and torsion arms 16a and 16b collectively form a vertical-sweep plant, i.e., a vertical beam scanner. The assembly 10 also includes vertical and horizontal sweep mechanisms (not shown) for rotating the reflector 12 about the vertical-sweep torsion arms 16a and 16b and the horizontal-sweep torsion arms 18a and 18b, respectively. By sweeping a light beam 22 in the horizontal and vertical dimensions, the reflector 12 scans a viewable image (not shown) on a display screen (not shown) or onto a viewer's retina (not shown). A MEMS assembly like the assembly 10 is disclosed in U.S. Pat. No. 5,629,790, entitled MICROMACHINED TORSIONAL SCANNER, issued May 13, 1997, to Armand P. Neukermans et al., which is incorporated by reference.

In operation, a vertical drive signal (not shown) causes the vertical sweep mechanism (not shown) to rotate the reflector 12 back and forth about the arms 16a and 16b, and to thus sweep the beam 22 in the vertical dimension. Simultaneously, a horizontal drive signal (not shown) causes the horizontal-sweep mechanism (not shown) to rotate the reflector 12 back and forth about the arms 18a and 18b, and to thus sweep the beam 22 in the horizontal dimension.

FIG. 2 is a time-domain plot of a desired, i.e., target, output response of the reflector 12 of FIG. 1 in the vertical dimension. The vertical axis represents the vertical position of the sweep beam 22 (FIG. 1), and the horizontal axis represents time. The output response, often called a "sawtooth wave," is periodic, with a period $T_{scan}$, which may equal, for example, $\frac{1}{60}^{th}$ of a second. At time $t_0$, the beam 22 is at the bottom of the scanned image (not shown), and thus at its minimum amplitude −A. −A corresponds to a maximum rotation of the reflector 12 about the torsion arms 16a and 16b in a first direction for the depicted application. During a flyback period $T_{flyback}$ between times $t_0$ and $t_1$, the beam 22 is inactive and rapidly "flies back" to the top of the scanned image, and thus to its maximum amplitude +A. +A corresponds to a maximum rotation of the reflector 12 about the torsion arms 16a and 16b in a second direction for the depicted application, the second direction being opposite to the first direction. During a sweep period $T_{sweep}$ between the times $t_1$ and $t_2$, the beam 22 is active and the reflector 12 sweeps the beam from its maximum vertical amplitude +A to its minimum vertical amplitude −A at a constant rate, i.e., constant velocity, to provide a constant vertical spacing between adjacent pairs of the horizontal lines that compose the scanned image (not shown).

FIG. 3 is a time-domain plot of a possible actual output response of the reflector 12 of FIG. 1 in the vertical dimension. This actual output response includes unwanted transient oscillations, often called "ringing", between times $t_1$ and $t_3$. Consequently, the reflector 12 is not sweeping the beam 22 (FIG. 1) at a constant vertical velocity, and is thus causing uneven vertical spacing between adjacent horizontal lines of the scanned image (not shown), during this transient period. Unfortunately, such uneven line spacing may generate visible artifacts such as "banding" (alternative light and dark horizontal bands) in the scanned image.

One technique for forcing the actual vertical sweep output response of the reflector 12 close enough to the target output response of FIG. 2 to eliminate image artifacts caused by uneven line spacing is driving the reflector with a negative-feedback control system as described above.

But unfortunately, even when driven with a negative-feedback control system, the reflector 12 may not have an actual output response that is close enough to the target output response of FIG. 2 to eliminate such image artifacts. A negative-feedback control system typically requires a relatively high gain and a relatively wide bandwidth to cause the reflector 12 to have an output response close to that of FIG. 2. But a high gain or wide bandwidth may give the control system a low margin of stability as discussed above. Furthermore, a wide bandwidth may cause the control system to amplify noise, i.e., to have a low noise immunity. A low stability margin may hinder the mass production of an image system that incorporates the reflector 12, because variations in the reflectors and other system components, even within expected tolerance ranges, may render some of the systems unstable, and thus unusable. And low noise immunity may allow noise-induced jitter or other disturbances to adversely affect the rotation of the reflector 12 in the vertical dimension, and thus may cause the actual output response of the reflector to deviate from the target output response by an unacceptable amount.

SUMMARY

A device for driving a plant, such as a beam scanner, includes a memory, drive-signal generator, and a calibrator. The memory stores data corresponding to the drive signal, and the generator generates the drive signal from the data and couples the drive signal to the plant. The calibrator measures a response of the plant to the drive signal, calculates a difference between the measured response and a corresponding target response, and reduces the difference by altering the drive signal.

Such a device can force the output response of a driven beam scanner to equal a target output response, or to be sufficiently close to the target response for a particular application, while the device is operating in an open-loop configuration. Furthermore, while operating in an open-loop configuration, such a device often has a greater stability margin and greater noise immunity than a comparable device that operates in a closed-loop configuration.

BRIEF DESCRIPTION OF THE DRAWINGS

Aspects and attendant advantages of embodiments of the invention will become more readily appreciated as the same become better understood by reference to the following non-limiting detailed description, when taken in conjunction with the accompanying drawings, wherein:

FIG. 2 is a time-domain plot of a target output response of the reflector of FIG. 1.

FIG. 3 is a time-domain plot of an actual output response of the reflector of FIG. 1.

DETAILED DESCRIPTION

The following discussion is presented to enable a person skilled in the art to make and use the invention. The general principles described herein may be applied to embodiments and applications other than those detailed below without departing from the spirit and scope of the present invention. Therefore the present invention is not intended to be limited to the embodiments shown, but is to be accorded the widest scope consistent with the principles and features disclosed or suggested herein.

This description is divided into two major sections, the second section having multiple sub-sections. The first section describes the theory upon which embodiments of the invention are based, and the second section describes embodiments of the invention.

Theory Upon Which Embodiments of the Invention are Based

Referring to FIGS. 4-10, it has been discovered that one can cause a plant, such as a beam scanner, to have a target output response by driving the plant in an open-loop configuration with a corresponding drive signal. That is, one can calculate the drive signal based on the plant's frequency response and the target output response (both of which are known), store data that defines a period of the calculated drive signal, generate the drive signal from the data, and drive the plant in an open-loop configuration with the drive signal. Then, one can periodically recalibrate the drive signal to account for variations in the plant over time or in response to external stimuli such as temperature or vibration. By driving the system in a open-loop configuration, one can avoid problems associated with driving the system in a closed-loop (negative-feedback) configuration.

Figure 4:
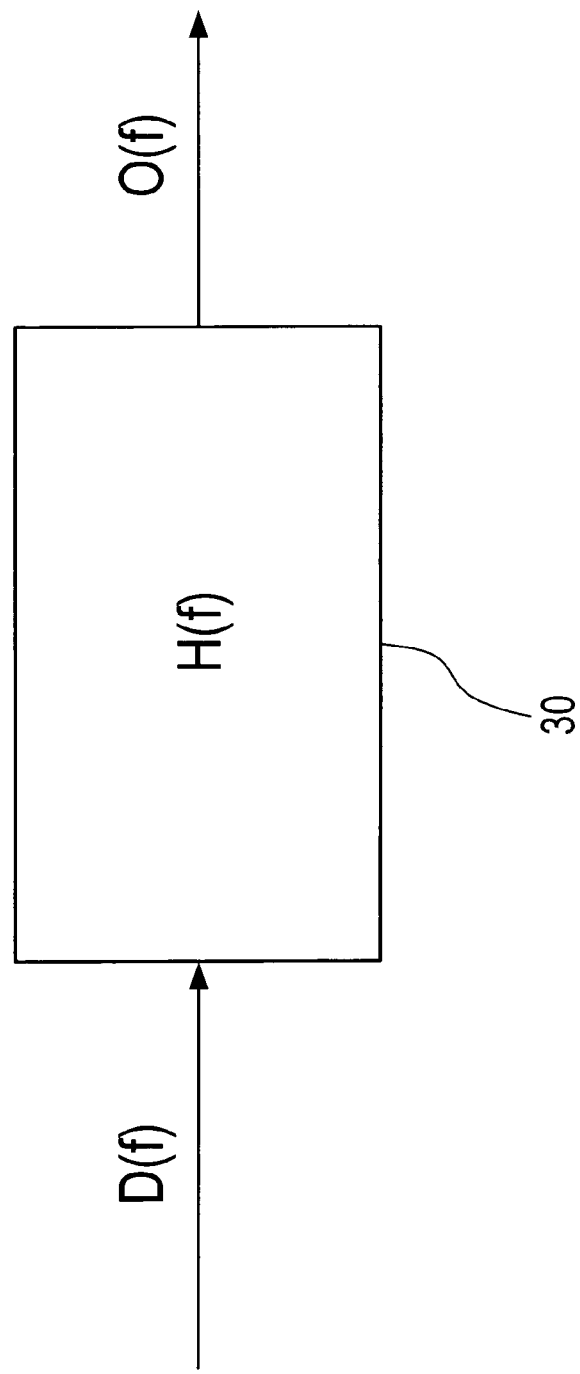
FIG. 4 is a block diagram of an embodiment of a plant represented in the frequency domain.

FIG. 4 is a block diagram of a plant 30 according to an embodiment of the invention. The plant 30 has a frequency response H(f), and, when driven by a drive signal D(f), has an actual output response O(f) where D(f), H(f), and O(f) are functions of frequency, i.e., are frequency domain functions. It is known that the quantities D(f), H(f), and O(f) are related by the following equations:

$$M[O(f)]=M[D(f)]\times M[H(f)] \quad (1)$$

$$A[O(f)]=A[D(f)]+A[H(f)] \quad (2)$$

where M denotes magnitude and A denotes phase. Typically, H(f) is known or can be determined by analyzing the plant 30. And where one wishes the plant 30 to have a target output response, $O_{target}(f)$ is also known. Therefore, one can solve for D(f), which is the only unknown quantity, according to the following equations:

$$M[D(f)]=M[O_{target}(f)]/M[H(f)] \quad (3)$$

$$A[D(f)]=A[O_{target}(f)]-A[H(f)] \quad (4)$$

That is, one calculates the magnitude and phase of D(f) according to equations (3) and (4), and drives the plant 30 with the calculated D(f) to obtain the target output response $O_{target}(f)$.

Figure 1:
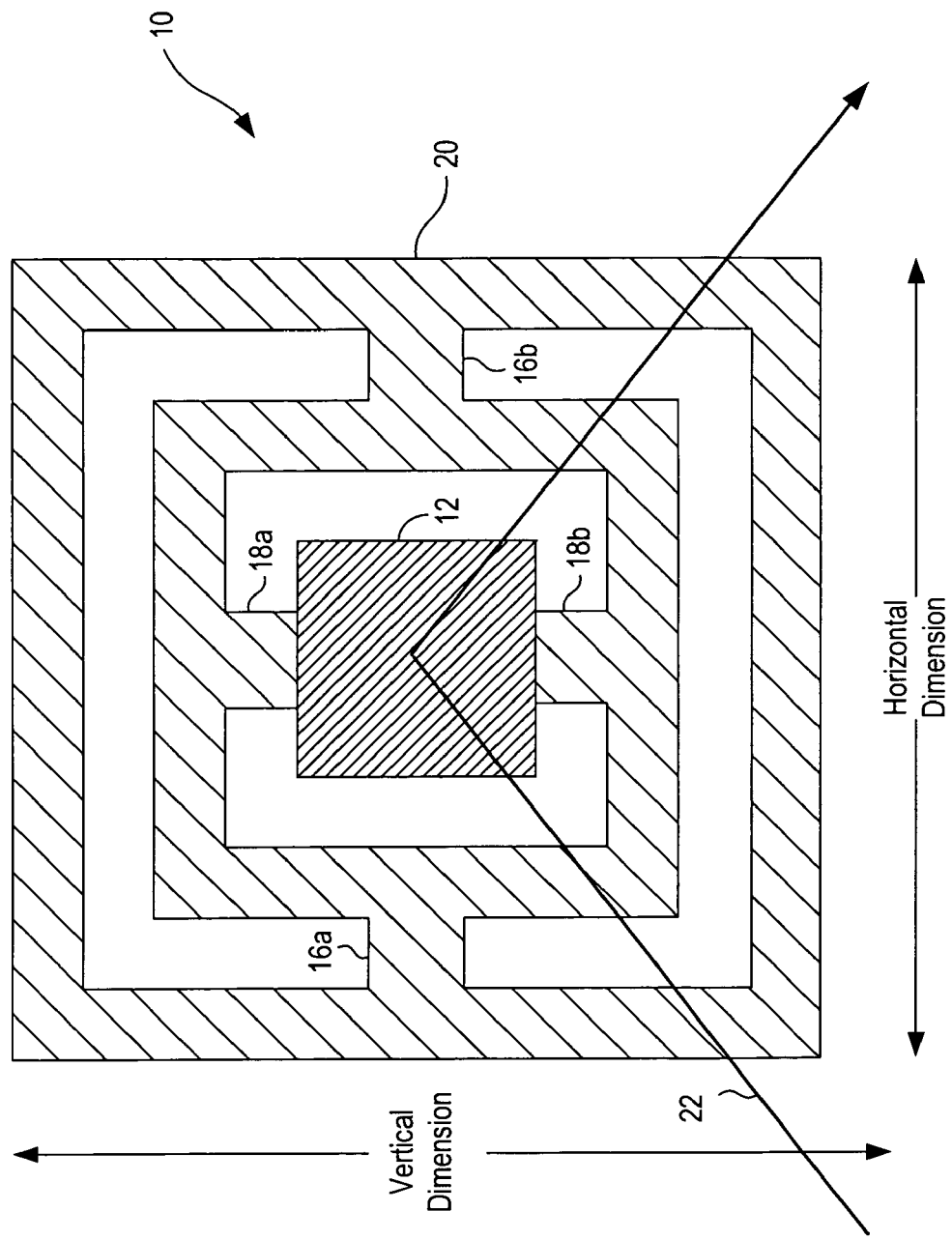
FIG. 1 is a plan view of a conventional MEMS assembly.
Figure 5:
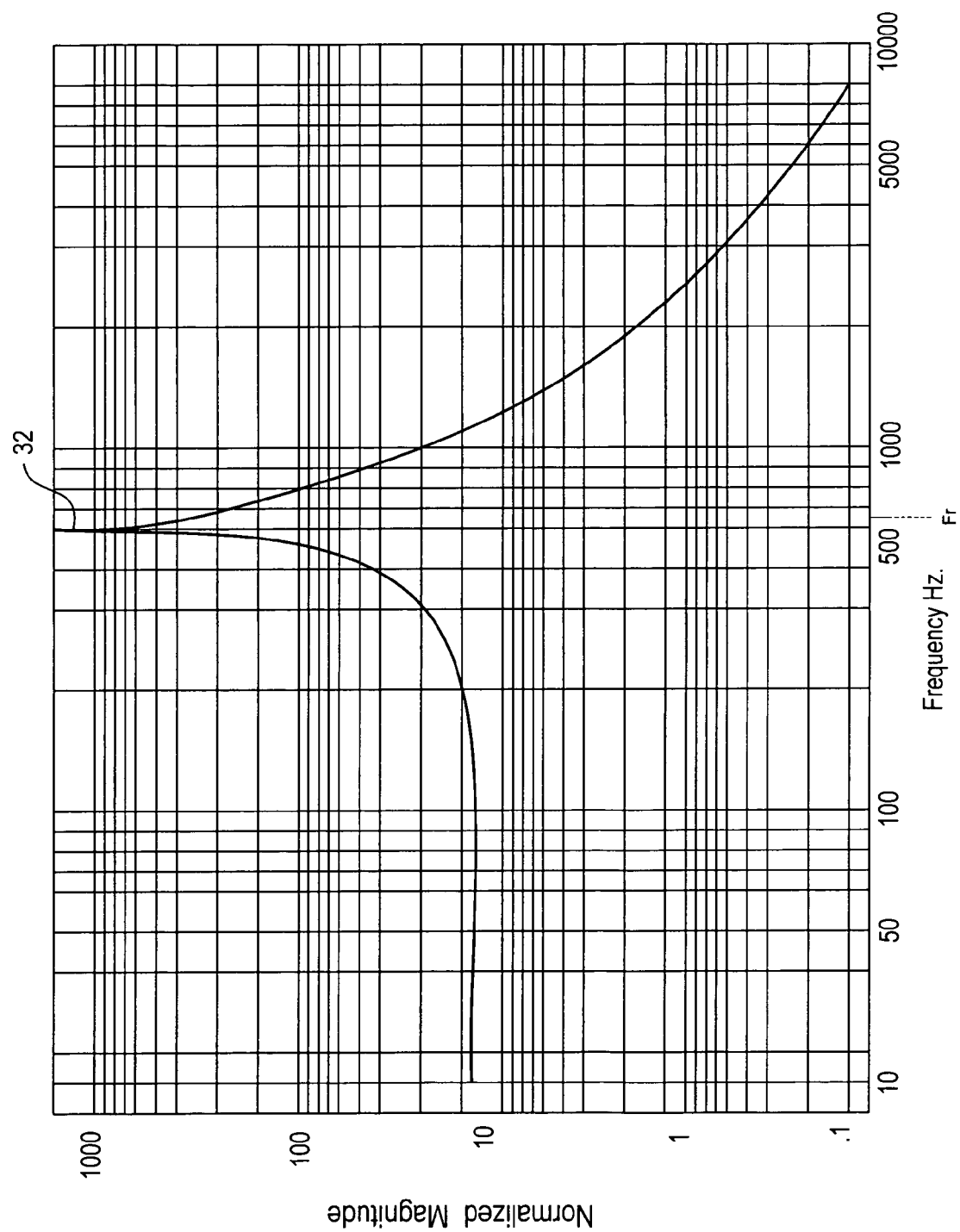
FIG. 5 is a frequency-domain plot of the magnitude response of an embodiment of a reflector such as the reflector of FIG. 1.

FIG. 5 is a log-log frequency-domain plot of the M[H(f)] of a plant, such as the reflector 12 of FIG. 1, according to an embodiment of the invention. The plot of A[H(f)] is omitted for brevity. The vertical axis represents normalized magnitude, and the horizontal axis represents frequency in Hertz (Hz). The peak 32 indicates that the reflector has a natural, i.e., resonant, frequency fr of approximately 500 Hz, and the relatively high gain at this peak indicates that the reflector is significantly under damped. It has been discovered that the "ringing" that occurs between times $t_1$ and $t_3$ of FIG. 3 is caused by frequencies in the drive signal D(f) that are equal to or approximately equal to fr and that excite the reflector 12.

Figure 6:
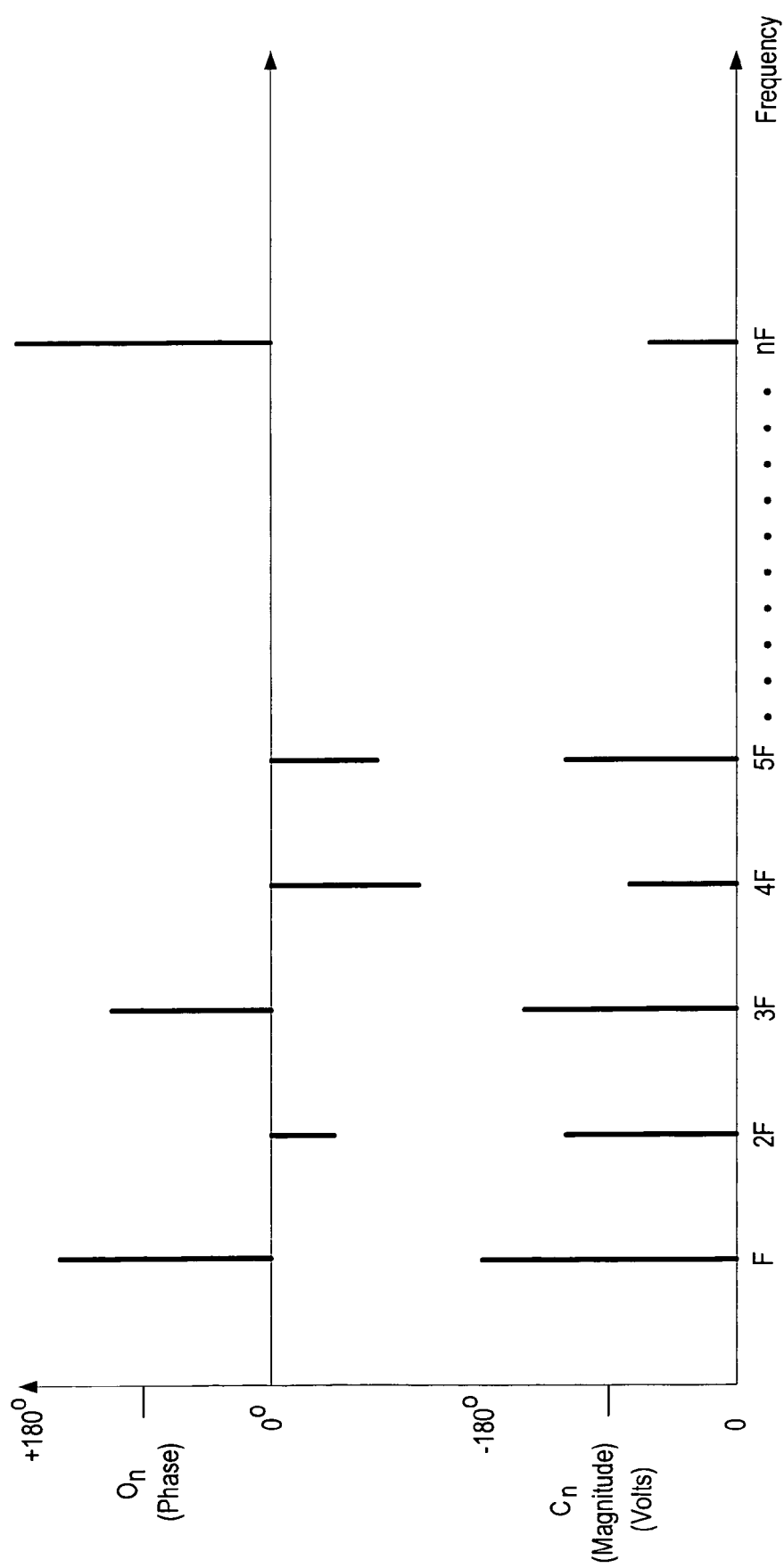
FIG. 6 is a frequency-domain plot of the Cosine Series Transform of an arbitrary periodic signal.

FIG. 6 is a plot of a Cosine Series Transform of an arbitrary periodic signal according to an embodiment of the invention. One can represent any waveform X(t) that is periodic in time (such as the target reflector output response of FIG. 2) as a sum of magnitude- and phase-adjusted cosines of the fundamental frequency and the harmonics of the fundamental frequency. The fundamental frequency F is given by the following equation:

$$F=1/T \quad (5)$$

where T is the period of X(t). The harmonics of F are integer multiples of F, and, are, therefore, equal to 0F, F, 2F, 3F, 4F ..., nF, where 0F is the DC component of X(t), 1F→nF are the AC harmonics of X(t), and n=∞. Consequently, one can represent X(t) as follows:

$$X(t) = \sum_{n=0}^{\infty} C_n \cos[2\pi nFt + \theta_n] \quad (6)$$

where $C_n$ is the amplitude and $\theta_n$ is the phase of the cosine of the $n^{th}$ harmonic. The expressions for $C_n$ and $\theta_n$ are known, and, therefore, are omitted for brevity. But as discussed further below, $C_n$ and $\theta_n$ are functions of frequency, not time.

Figure 7:
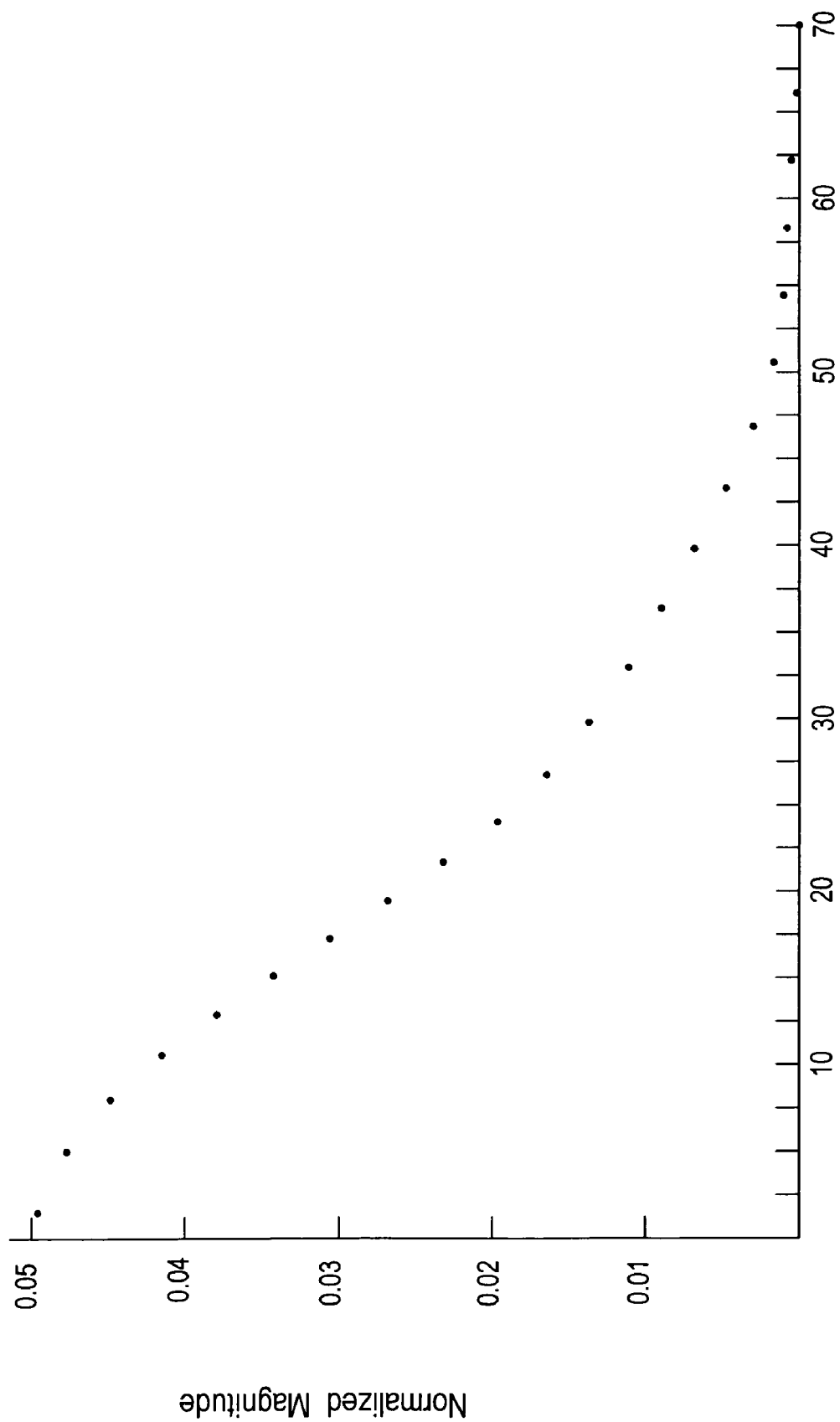
FIG. 7 is a frequency-domain plot of the Cosine Series Transform of the target reflector output response of FIG. 2 according to an embodiment.

FIG. 7 is a frequency-domain plot of the Cosine Series Transform $O_{target}(f)$ of the target time-domain reflector output response $O_{target}(t)$ of FIG. 2 according to an embodiment of the invention. The vertical axis represents the normalized amplitude $C_n$ (the phase $\theta_n$ is omitted for brevity), and the horizontal axis represents the frequency harmonics nF=n/$T_{scan}$. One can see that the harmonics higher than approximately the seventieth harmonic (70F) contribute little to $O_{target}$. That is, the first seventy harmonics contain virtually all of the energy of $O_{target}$.

Figure 8:
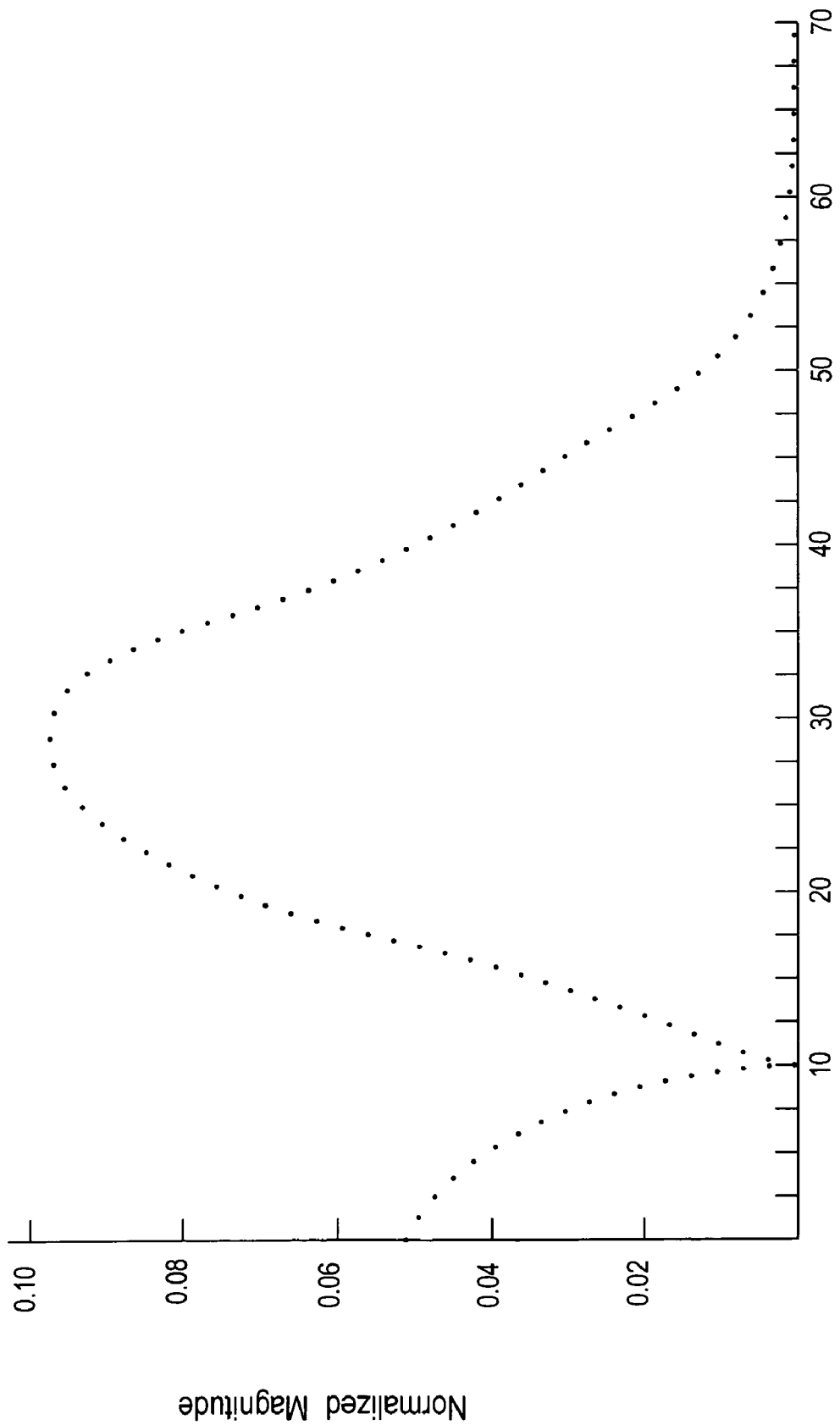
FIG. 8 is a frequency-domain plot of the Cosine Series Transform of a drive signal that causes a reflector having the magnitude response of FIG. 5 to have the target output response of FIGS. 2 and 7 according to an embodiment.

FIG. 8 is a frequency-domain plot of the Cosine Series Transform D(f) of the time-domain drive signal D(t) that causes a reflector with the response H(f) of FIG. 5 to sweep a beam according to the target output response $O_{target}(t)$ of FIG. 2 according to an embodiment of the invention. Like FIG. 7, the vertical axis represents the normalized magnitude $C_n$ (the phase $\theta_n$ is omitted for brevity), and the horizontal axis represents the frequency harmonics nF=n/$T_{scan}$. Because a reflector with the response H(f) of FIG. 5 is a linear time-invariant plant, the reflector only affects the magnitudes and phases of the harmonics of D(t), but does not shift the frequencies of the harmonics. Therefore, the harmonics nF of $O_{target}(t)$ are the same as the harmonics of D(t), and vice-versa.

Still referring to FIG. 8, the calculation of the plotted Cosine Series Transform D(t) is discussed. Because the reflector frequency response H(f) of FIG. 5 is linear and time invariant, and because $O_{target}(t)$ of FIG. 2 is a periodic signal having the Cosine Series Transform $O_{target}(f)$ of FIG. 7, one can represent the magnitude of H(f) by the following series of magnitude values:

$$M[H(nF)]=M[H(F)], M[H(2F)], M[H(3F)], \ldots, M[H(nF)] \quad (7)$$

and one can represent the phase of H(f) by the following series of phase values:

$$A[H(nF)]=A[H(F)], A[H(2F)], A[H(3F)], \ldots, A[H(nF)] \quad (8)$$

The values of M[H(nF)] for n=0→∞ can be determined from the frequency-domain magnitude plot of FIG. 5 or in another known manner, and the values of A[H(nF)] for n=0→∞ can be determined from a frequency-domain phase plot (not shown) or in another known manner.

Furthermore, from equation (6) one can derive the following expression for $O_{target}(t)$ of FIG. 2:

$$O_{target}(t) = \sum_{n=0}^{\infty} C_{targetn} \cos[2\pi nFt + \theta_{targetn}] \quad (9)$$

Because like $M[HC_nF]$ and $A[HC_nF]$ the amplitude coefficients $C_n$ and the phase coefficients $\theta_n$ are functions of frequency and not time, and are thus represented in the frequency domain, one can derive the following expression for D(t) from equations (3), (4), and (6):

$$D(t) = \sum_{n=0}^{\infty} \frac{C_{targtn}}{M[H(nF)]} \cos[2\pi nFt + \theta_{targetn} - A[H(nF)]] \quad (10)$$

And from equation (10), one can derive the following expression for the frequency-domain transform D(f) of D(t):

$$D(f) = \frac{CTarget0}{M[H(F)]} @\theta 1 - A[H(0)], \quad (11)$$

$$\frac{CTarget1}{M[H(F)]} @\theta 2 - A[H(F)], \ldots, \frac{CTargetn}{M[H(nF)]} @\theta n - A[H(nF)]$$

for n=0→∞. One can see from equation (11) that D(f) merely equals the coefficients from the right-hand side of the time-domain equation (10).

Referring to FIGS. 5 and 8 and assuming that for the reflector 12 of FIG. 1 the fundamental frequency F=1/$T_{scan}$≈60 Hz, one can see that at 9F≈540 Hz, because the reflector has a high gain, the drive signal D(f) has an offsetting low (approximately zero) gain. And like the target output response $O_{target}$(f) of FIG. 7, the first seventy harmonics 0F-70F contain virtually all of the energy of D(f).

Figure 9:
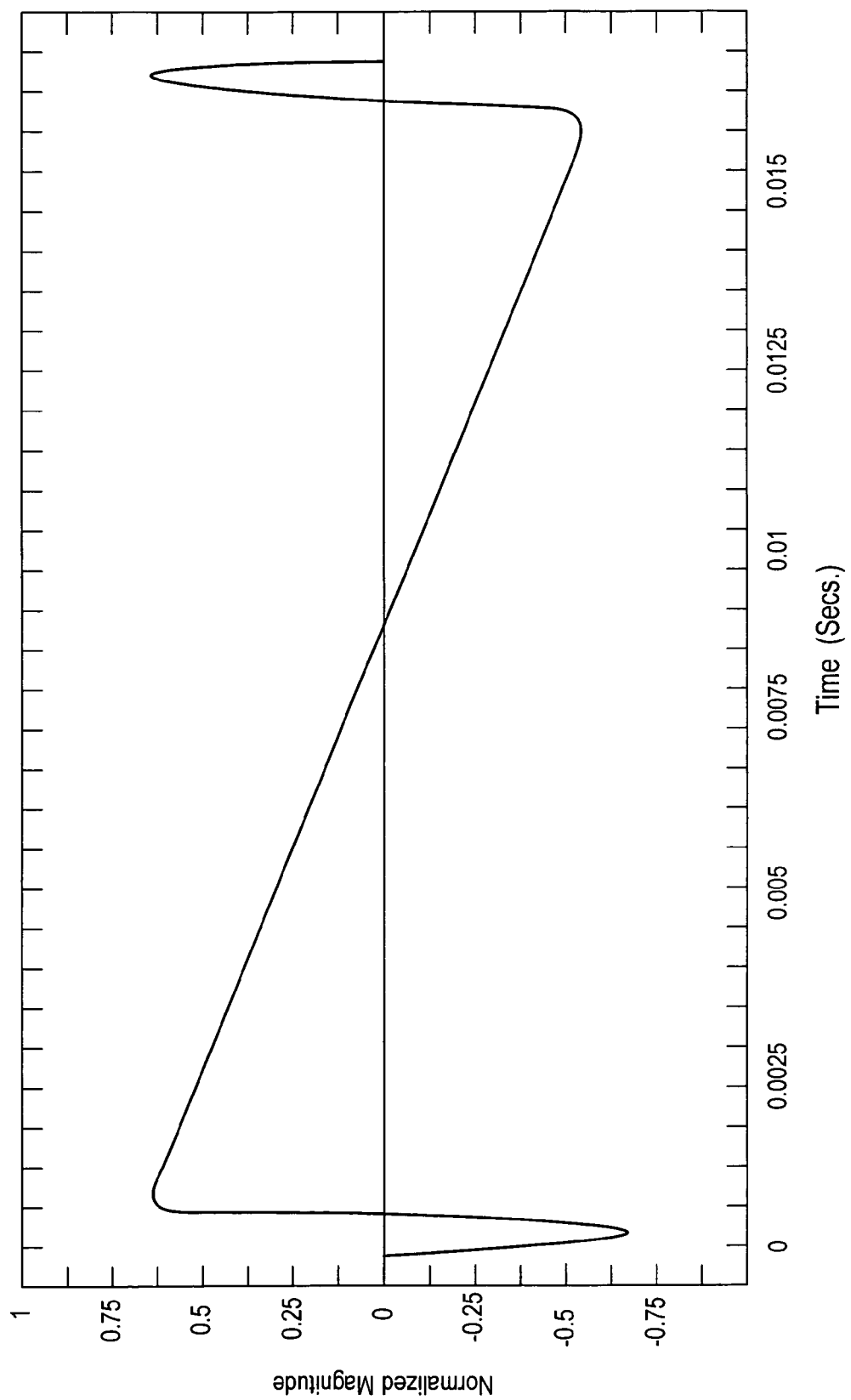
FIG. 9 is a time-domain plot of a drive signal generated using a major harmonics of the drive signal of FIG. 8 according to an embodiment.

FIG. 9 is a time-domain plot of the driving signal D(t) of equation (10) where $C_{targetn}$ is obtained from the magnitude plot of $O_{target}$(f) in FIG. 7, $O_{targetn}$ is obtained from the magnitude plot of H(f)g FIG. 5, A[(HnF)] is obtained from a corresponding phase plot of (not shown) of H(t), and $C_{targetn}$=0 for n>70 according to an embodiment of the invention.

Figure 10:
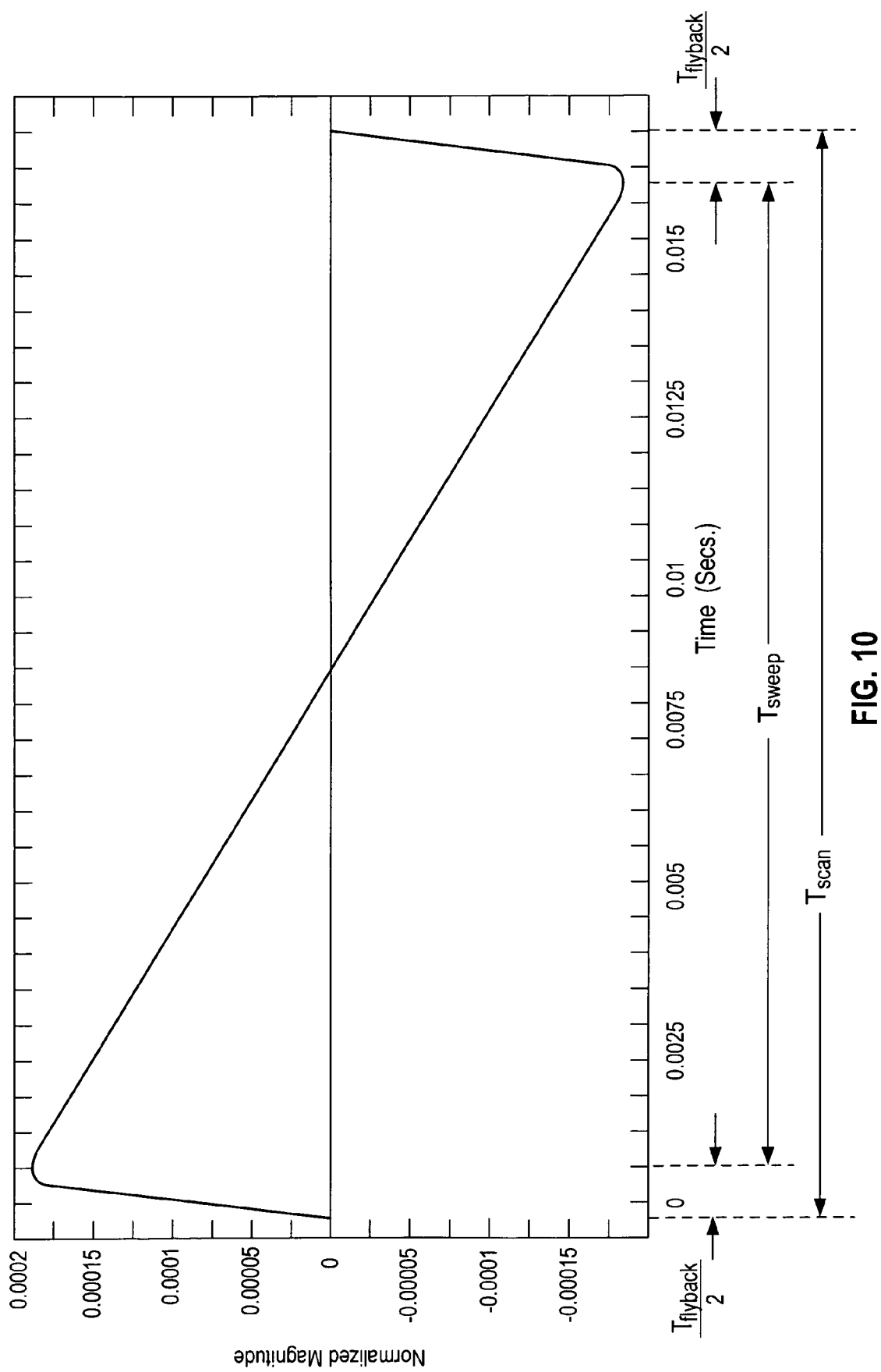
FIG. 10 is a plot of an actual output response of an embodiment of a reflector having the magnitude response of FIG. 5 and being driven with the drive signal of FIG. 9.

FIG. 10 is a time-domain plot of the actual output response $O_{actual}$(t) of a reflector according to an embodiment of the invention where the reflector has the magnitude response H(f) of FIG. 5 and is driven by the drive signal D(t) of FIG. 9. One can see that except for some rounding of the positive and negative peaks, $O_{actual}$(t) is virtually identical to the target output response $O_{target}$(t) of FIG. 2, particularly during the period $T_{sweep}$. The rounding of the peaks is due to the elimination in D(t) of harmonies greater than 70F.

In summary, referring again to FIGS. 4-10 and to equations (1)-(11), if one knows the target output response $O_{target}$(f) and the frequency response H(f) of a plant 30, then one can mathematically compute the drive signal D(f) that causes the plant to have the target output response.

But in many cases, only an estimate of the plant's frequency response H(f) is available. For example, if the plant 30 is a MEMS reflector that is mass produced, then the frequency response H(f) likely varies from reflector to reflector due to variations in the manufacturing process from batch to batch. Furthermore, H(f) may change as the reflector ages, or in response to external stimuli such as temperature for a reflector or other mechanical plant, moreover, the effective H(f) may change in response to external stimuli such as vibration.

Therefore, the next section describes embodiments of systems and techniques for tuning the drive signal D for a target output response $O_{target}$ when only an estimate of the plant frequency response H(f) is initially available, and for retuning D in response to an actual or effective change in H(f).

Embodiments

Figure 11:
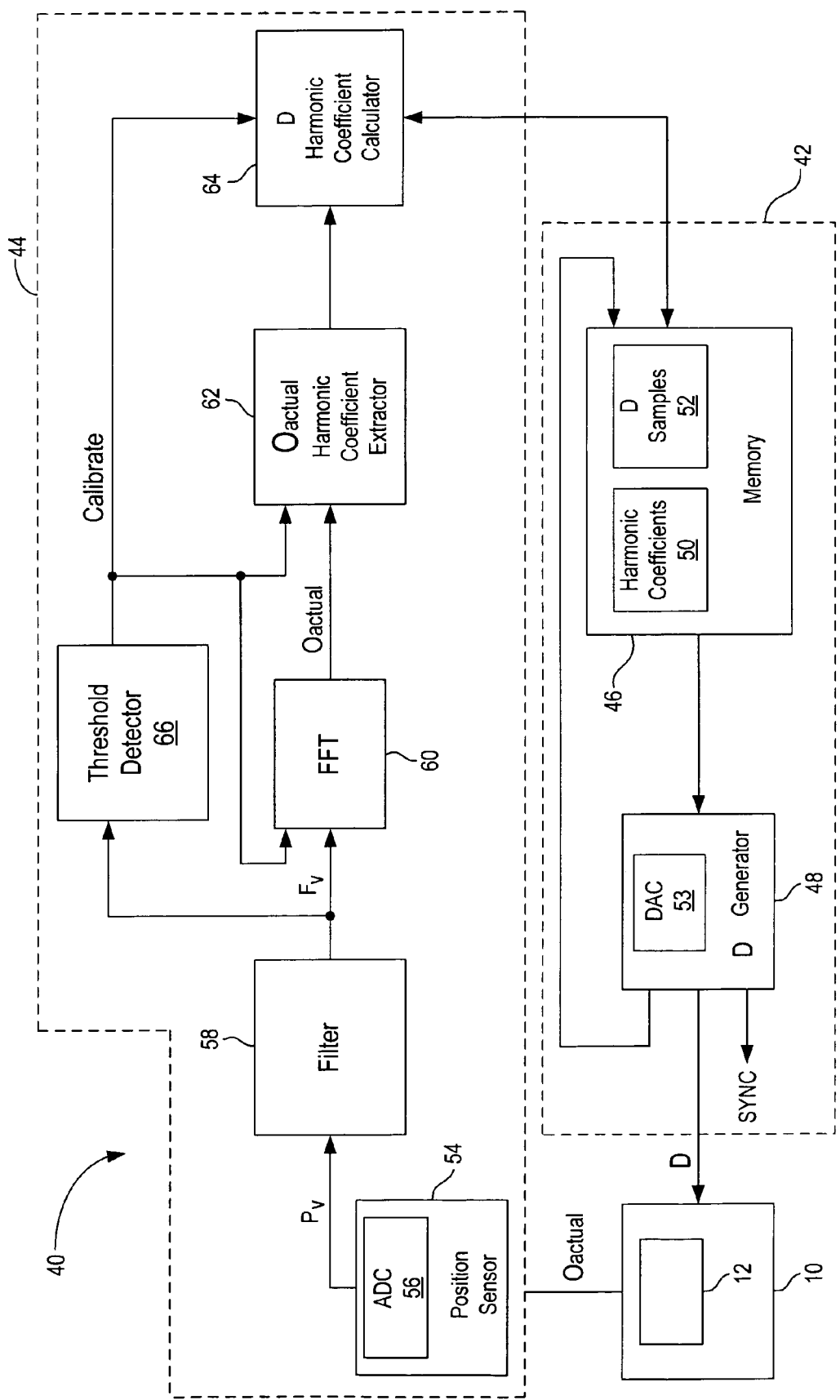
FIG. 11 is a functional block diagram of an embodiment of an image-scanning system that includes a reflector, such as the reflector of FIG. 1, a drive circuit for driving the reflector, and a circuit for calibrating the drive circuit.

FIG. 11 is a functional block diagram of an image-scanning system 40, which includes the MEMS assembly 10 of FIG. 1 having the reflector 12, a driver 42 for driving the reflector in the slow-scan dimension with a drive signal D, and a calibrator 44 for tuning and retuning D such that the reflector has a target output response $O_{target}$ according to an embodiment of the invention. One may implement the driver 42 and the calibrator 44 with one or more processors executing software, with one or more digital circuits with, one or more analog circuits, or with a combination or subcombination of one or more processors, one or more digital circuits, and one or more analog circuits. In one example, a single digital-signal processor (DSP) implements the driver 42 and the calibrator 44.

Referring to the MEMS assembly 10, and as discussed above in conjunction with FIG. 1, the drive signal D is an analog signal that drives the reflector 12 in the slow-scan dimension, which is the vertical dimension in this embodiment. In response to the signal D and a fast-scan (horizontal dimension in this embodiment) drive signal (not shown), the reflector 12 sweeps the light beam 22 horizontally and vertically to generate a viewable image on a display screen or directly on the retina of a viewer's eye (none of these elements shown in FIG. 11).

The driver 42 includes a memory 46 for storing data from which a drive-signal generator 48 generates the analog drive signal D.

In a table 50, the memory 46 stores the magnitude and phase coefficients (e.g., $C_n$ and $0_n$, respectively) of the harmonics that compose D, and in a table 52 the memory stores samples of D(t). In one example, the memory 46 is a nonvolatile memory, such as electrically erasable-and-programmable-read-only memory (EEPROM).

As discussed below, during drive-signal calibrating and recalibrating modes, the generator 48 generates the drive signal D from the harmonic coefficients stored in the table 50, and with a digital-to-analog converter DAC 53, converts these samples into the analog drive signal D.

During an image-scanning mode, the generator 48 generates the drive signal D by directly converting the digital samples in the table 52 into corresponding analog values with the DAC 53.

The generator 48 also generates a signal SYNC, which synchronizes the image-generation circuitry (not shown) so that the pixel content of the beam 22 (FIG. 1) swept by the reflector 12 is synchronized to the vertical position of the beam.

During an image-scanning mode—as compared to the drive-signal calibrating and recalibrating modes—the driver 42 operates in an open-loop configuration. Consequently, the driver 42 typically does not exhibit the problems, such as instability and noise jitter, that a driver operating in a closed-loop (negative feedback) configuration may exhibit.

Still referring to FIG. 11, the calibrator 44 includes a reflector-position sensor 54 having an analog-to-digital converter (ADC) 56, a filter 58, a Fast Fourier Transformer (FFT) 60, a harmonic-coefficient extractor 62, a harmonic-coefficient calculator-sweep 64, and a threshold detector 66.

The position sensor 54 generates an internal analog position signal that the ADC 56 converts into a digital position signal $P_v$, which is the digital representation of the actual reflector output response $O_{actual}$(t). That is, $O_{actual}$(t) indicates the instantaneous position of the reflector 12. In one example, the torsion arms 16a and 16b (FIG. 1) exhibit an electrical impedance having a magnitude that is proportional to the instantaneous vertical-rotation position of (not shown) the reflector 12. The sensor 52 includes conventional circuitry (not shown) that generates an analog signal having a magnitude that is proportional to this varying impedance, and that is thus proportional to the vertical-rotation position of the reflector and the vertical-sweep position of the beam 22. Alternatively, the sensor 52 may implement another position-sensing technique, such as an optical technique, to generate the analog position signal. The ADC 56 converts the analog position signal into the digital position signal $P_v$ by sampling the analog position signal at discrete time intervals in response to a sampling clock (not shown).

The filter 58 generates a filtered digital position signal $F_v$ from the digital position signal $P_v$ with a conventional algorithm. For example, the filter may generate the samples of $F_v$ equal to a time average of the respective samples of $P_v$ to reduce noise in $F_v$.

During the calibrating and recalibrating modes, which are further discussed below, the FFT 60 computes the Fourier Transform of $O_{actual}(t)$ from the digital signal $F_v$ using a conventional algorithm. $O_{actual}(f)$ typically includes N sets of phasor coefficients that represent N/2 harmonics of $O_{actual}(t)$ where N is the number of samples that the ADC 56 generates from the actual output response $O_{actual}(t)$ during each period $T_{scan}$. In one example, the FFT 60 is a 1024-point FFT (N=1024).

Also during the calibrating and recalibrating modes, the harmonic coefficient extractor 62 converts the phasor coefficients of $O_{actual}(f)$ from the FFT 60 into the magnitude and phase coefficients of the harmonics that the phasors represent. In one example, the extractor 62 converts the phasor coefficients into Cosine Series Transform coefficients $O_n$ and $C_n$ as discussed above in conjunction with FIGS. 6-8 and as further discussed below.

The harmonic-coefficient calculator 64 calculates new coefficients for the harmonics of D(t) from the coefficients of the harmonics of $O_{actual}(t)$ provided by the harmonic-coefficient extractor 62. The calculator 64 may then store these new coefficients in the table 50, or may modify these coefficients as discussed below before storing them in the table.

The threshold detector 60 generates, in response to the signal $F_v$, a signal CALIBRATE that indicates whether or not the actual output response $O_{actual}$ of the reflector 12 is within specification, i.e., is within a desired "distance" from the target output response $O_{target}$. In one example, the detector 66 measures and compares one or more characteristics of $O_{actual}$ with respective threshold values for these characteristics. Based on the relationship between the measured characteristic(s) and the corresponding threshold value(s), the detector 66 determines whether or not $O_{actual}$ is within specification. If the threshold detector 66 determines that $O_{actual}$ is not within specification, then it causes the system 40 to tune or retune the harmonic coefficients of D(t) as discussed below.

Still referring to FIG. 11, the operation of the image-scanning system 40 is discussed according to an embodiment of the invention. In this embodiment, the system 40 has three operating modes: a calibrating mode, an image-scanning mode, and a recalibrating mode.

Calibrating Mode

A manufacturer of the image-scanning system 40 typically runs the system in the calibrating mode to tune the drive signal D before shipping the system (or a product that incorporates the system) to a customer.

First, the manufacture loads into the harmonic-coefficient table 50 of the memory 46 estimated magnitude and phase coefficients for a predetermined number of harmonics of the driving signal D. These estimated coefficients may be those for a driving signal D that was previously tuned for another reflector that is similar to the reflector 12. Alternatively, these coefficients may be determined from a computer characterization of the reflector 12 or in any other suitable manner. In one example, the manufacturer loads the table 50 with non-zero magnitude coefficients for only the first twenty four AC harmonics (the magnitude of the DC harmonic 0F is also zero) of D(t), because it has been determined that for many image-scanning applications, generating D from only the first twenty four AC harmonics provides a satisfactory reflector output response $O_{actual}$.

Then, the drive-signal generator 48 generates the drive signal D from the coefficients stored in the table 50, and drives the reflector 12 in the vertical dimension with D. In one example, the generator 48 converts the harmonic coefficients stored in the table 50 into corresponding phasor coefficients, and includes an Inverse Fast Fourier Transformer (IFFT) (not shown) that converts the phasor coefficients into digital values, which the DAC 53 converts into the analog drive signal D. But because an IFFT typically consumes significant amounts of power and processing time, the generator 48 may implement other, less time-and power-consuming techniques. According to one such technique, the generator 48 includes n frequency generators (not shown) that each generate a sinusoid having the frequency of a respective harmonic nF of D and the magnitude and phase of the corresponding harmonic coefficients stored in the table 50. That is, the generator 48 includes a first-harmonic generator (not shown) that generates a first signal $M[D(F)]\cos(2\pi F-A[D(F)])$, a second harmonic generator (not shown) that generates a second signal $M[D(2F)]\cos(2\pi 2F-A[D(2F)])$, ..., and an $n^{th}$-harmonic generator (not shown) that generates an $n^{th}$ signal $M[D(nF)]\cos(2\pi nF-A[D(nF)])$. The generator 48 then sums the first through $n^{th}$ signals at predetermined sample intervals to generate the digital samples that the DAC 53 converts into the analog drive signal D. Assuming N=2n evenly spaced intervals per period $T_{scan}$ of D(t) (D(t) has the same period as $O_{target}(t)$), D(kt), which is the magnitude of D(t) during the $k^{th}$ interval, is given by the following equation:

$$D(kt) = M[D(F)]\cos(2\pi Fk/N - A[D(F)]) + \quad (12)$$
$$M[D(2F)]\cos(2\pi 2Fk/N - A[D(2F)]) +$$
$$\ldots + M[D(nF)]\cos(2\pi nFk/N - A[D(nF)])$$

for k=0 to N−1. Typically, the number of intervals N per period $T_{scan}$ of D(t) is the same as the number of samples that $P_v$ and $F_v$ include per period $T_{scan}$ of $O_{actual}(t)$ as discussed above.

Next, the position sensor 54 generates the digital signal $P_v$, which indicates the vertical-rotation position of the reflector 12 and the vertical-sweep position of the beam 22 (FIG. 1), as discussed above. In one example, the signal $P_v$ includes N digital-sample values per period $T_{scan}$ of the output response $O_{actual}(t)$ as discussed in the preceding paragraph.

Then, the filter 58 generates the signal $F_v$ from the signal $P_v$ as discussed above. In one example, the filter 58 is an infinite impulse response (IIR) filter that averages corresponding sample values k of $P_v$ over multiple periods $T_{scan}$ of the reflector 12 to filter out noise and/or other non-coherent anomalies. Therefore, the sample values k of the signal $F_v$ have respective averaged values per the following equation:

$$S_k F_v = (S_k P_v + S_k P_{v1} + \ldots + S_k P_{vb})/b \quad (13)$$

where $S_k F_v$ is the $k^{th}$ sample of $F_v$, $S_{kb} P_v$ is the $b^{th}$ value of the $k^{th}$ sample of $P_v$, and b is the number of periods $T_{scan}$ over which $P_v$ is averaged to generate $F_v$. As discussed further below, in one example k=0→N−1=1023 and b=20.

Next, as described above, the FFT 60 generates the phasor coefficients of $O_{actual}$ from $F_v$. In one example, the FFT 60 is a 1024-point FFT, which computes the magnitude and phase coefficients for 1024 phasors of the fundamental frequency $F=1/T_{scan}$ (this corresponds to 512 harmonics of F). Therefore, in this example, $P_v$ and $F_v$ include N=1024 samples of the actual reflector output response $O_{actual}$ to satisfy the Nyquist criteria, which states that the rate at which $O_{actual}$ is sampled should be at least twice the frequency of the highest-harmonic (here the $512^{th}$ harmonic) for which the FFT 60 generates a phasor.

Then, the harmonic-coefficient extractor 62 converts the phasor coefficients of $O_{actual}(t)$ from the FFT 60 into the Cosine Series Transform coefficients $C_n$ and $O_n$ of $O_{actual}(t)$ as discussed above. Furthermore, because as discussed above in conjunction with FIG. 7, the Cosine Series Transform coefficients $C_n$ of the target output response $O_{target}(t)$ are negligible after about the seventieth harmonic (70F), the extractor 62 may extract nonzero coefficients for only a predetermined number of harmonics. In one example, the extractor 62 extracts nonzero coefficients for only the first twenty four AC harmonics of $O_{actual}(t)$. As discussed above, the first twenty four AC harmonics have been empirically determined to be a sufficient number of harmonics from which to generate the drive signal D(t).

Next, the harmonic-coefficient calculator 64 calculates the frequency response H(f) of the reflector 12 from the Cosine Series Transform coefficients extracted from $O_{actual}(t)$ and from the Cosine Series Transform coefficients of D(t), which are stored in the table 50. Specifically, the calculator 64 calculates the magnitude and phase of the frequency response H(t) according to the following equations, which are derived from equations (9)-(11):

$$M[H(nF)] = M[O_{actual}(nF)]/M[D(nF)] \tag{14}$$

$$A[H(nF)] = A[O_{actual}(nF)] - A[D(nF)] \tag{15}$$

That is, $M[H(F)]=M[O_{actual}(F)]/M[D(F)]$, $M[H(2F)]=M[O_{actual}(2F)]/M[D(2F)]$, $M[H(3F)]=M[O_{actual}(3F)]/M[D(3F)]$, ..., $M[H(nF)]=M[O_{actual}(nF)]/M[D(nF)]$, and $A[H(F)]=A[O_{actual}(F)]-A[D(F)]$, $A[H(2F)]=A[O_{actual}(2F)]-A[D(2F)]$, $A[H(3F)]=A[O_{actual}(3F)]-A[D(3F)]$, ..., $A[H(nF)]= A[O_{actual}(nF)]-A[D(nF)]$.

Then the harmonic-coefficient calculator 64 determines new magnitude and phase coefficients for the harmonics of D(t) from the newly calculated magnitude and phase coefficients for H(f) according to the following equations, which are derived from equations (10) and (11):

$$M[D_{new}(nF)] = M[O_{target}(nF)]/M[H(nF)] \tag{16}$$

$$A[D_{new}(nF)] = A[O_{target}(nF)] - A[H(nF)] \tag{17}$$

Next, the harmonic-coefficient calculator 64 determines whether or not to tune the current D(t) harmonic coefficients, which are stored in the table 50, based on a comparison to the newly calculated coefficients $D_{new}(nF)$. That is, for each harmonic n, the calculator 64 compares $M[D_{new}(nF)]$ to $M[D(nF)]$ and compares $A[D_{new}(nF)]$ to $A[D(nF)]$.

If the difference between each pair of corresponding coefficients $D_{new}(nF)$ and $D(nF)$ has a predetermined relationship to a respective predetermined threshold, then the harmonic-coefficient calculator 64 determines that the current harmonic coefficients $D(nF)$ do not need tuning, and causes the system 40 to exit the calibrating mode. This means that the current harmonic coefficients $D(nF)$ provide a drive signal D that causes the reflector 12 to have a satisfactory output response $O_{actual}(t)$ in the vertical dimension. Consequently, the system 40 maintains the current coefficients D(nF) in the table 50 such that the generator 48 thereafter generates the drive signal D from these stored current coefficients (or from samples D(kt) derived from these coefficients).

Conversely, if the difference between at least one pair of corresponding coefficients $D_{new}(nF)$ and $D(nF)$ does not have a predetermined relationship to a respective predetermined threshold, then the harmonic-coefficient calculator 64 determines that at least some of the current coefficients D(nF) need tuning, and thus proceeds to tune the current coefficients and continue the calibrating procedure.

For example, suppose that for the third harmonic 3F of D(t), the magnitude threshold is ±50 millivolts (mV) and the phase threshold is ±3°. Further suppose that the harmonic-coefficient calculator 64 tunes all current coefficients that differ from the new coefficients by more than the respective thresholds, and that the actual differences between the new and current magnitude and phase coefficients for the third harmonic are given by the following equations:

$$M[D_{new}(3F)] - M[D(3F)] = +120 \text{ mV} \tag{18}$$

$$A[D_{new}(3F)] - A[D(3F)] = -6° \tag{19}$$

Because these differences respectively exceed the magnitude and phase thresholds (±50 mV, ±3°) for the third harmonic, the coefficient calculator 64 replaces current magnitude and phase coefficients M[D(3F)] and A[D(3F)] in the table 50 with $M[D_{new}(3F)]$ and $A[D_{new}(3F)]$, respectively. In a similar manner, the calculator 64 replaces any other current coefficients where the difference between the new and current coefficient for a particular harmonic exceeds the threshold for that harmonic. After the calculator 64 tunes all of the coefficients that need tuning and updates the coefficient table 50 accordingly, the generator 48 generates D from the coefficients stored in the table 50, and the system 40 repeats the calibrating procedure.

Although in the above-described embodiment each harmonic is described as having unique magnitude and phase thresholds, some or all of the harmonics may have the same magnitude and/or phase thresholds.

In an alternative embodiment, instead of replacing a current coefficient D(nF) with a new coefficient $D_{new}(nF)$ when the difference between the new and current coefficients does not meet a predetermined threshold requirement, the harmonic-coefficient calculator 64 replaces the current coefficient with a modified version of the new coefficient. This can increase the stability of the calibration by preventing the system 40 from overshooting the coefficients that provide the desired reflector output response $O_{actual}$. For example, assume the same coefficient differences for the third harmonic 3F per equations (18) and (19). Instead of fully correcting the error (i.e., setting the difference to zero) in M[(3F)] and A[D(3F)], the coefficient calculator 64 may only partially correct these coefficients. For example, the calculator 64 may correct for only a third of the error per the following equations:

$$M[D_{modified}(3F)] = M[D(3F)] + M[D(3F)] - M[D(3F)]$$
$$= M[D(3F)] + 120/3 \text{ mV} = M[D(3F)] + 40 \text{ mV} \tag{20}$$

$$A[D_{modified}(3F)] = A[D(3F)] + [A[D_{new}(3F)] - A[D(3F)]]$$
$$= A[D(3F)] - (6°/3) = A[D(3F)] - 2° \tag{21}$$

That is, the calculator 64 has effectively reduced the error in the coefficients M[D(3F)] and A[D(3F)] by 33.3% instead of by 100%. In a similar manner, the calculator 64 then determines modified magnitude and phase coefficients for any other harmonics where the difference between the new and current coefficients exceeds the respective threshold, replaces the corresponding current coefficients in the table 50 with these modified coefficients, and causes the system 40 to repeat the calibration procedure. Such partial correction effectively reduces the gain of the calibration loop—the loop formed by the driver 42, reflector 12, and calibrator 44—and thus increases the stability of the loop. An increase in the loop's stability can reduce or eliminate oscillations while the harmonic coefficients for D(t) converge to suitable values.

Then, the driver 42 and calibrator 44 repeat the above-described calibration procedure until the differences between all new and current harmonic coefficients meet their respective threshold requirements. At this point, the table 50 stores the tuned harmonic coefficients for a drive signal D that causes the reflector 12 to have an actual output response $O_{actual}$ that is sufficiently close to the target output response $O_{target}$ of FIGS. 2 and 7 for a desired quality of the scanned image (not shown).

Next, after all of the tuned harmonic coefficients for the drive signal D(t) are stored in the table 50, the generator 48 generates digital samples of D as discussed above, and stores these samples in the table 52. Thereafter, the generator 48 merely clocks out these stored samples via the DAC 53 to generate D.

Figure 12:
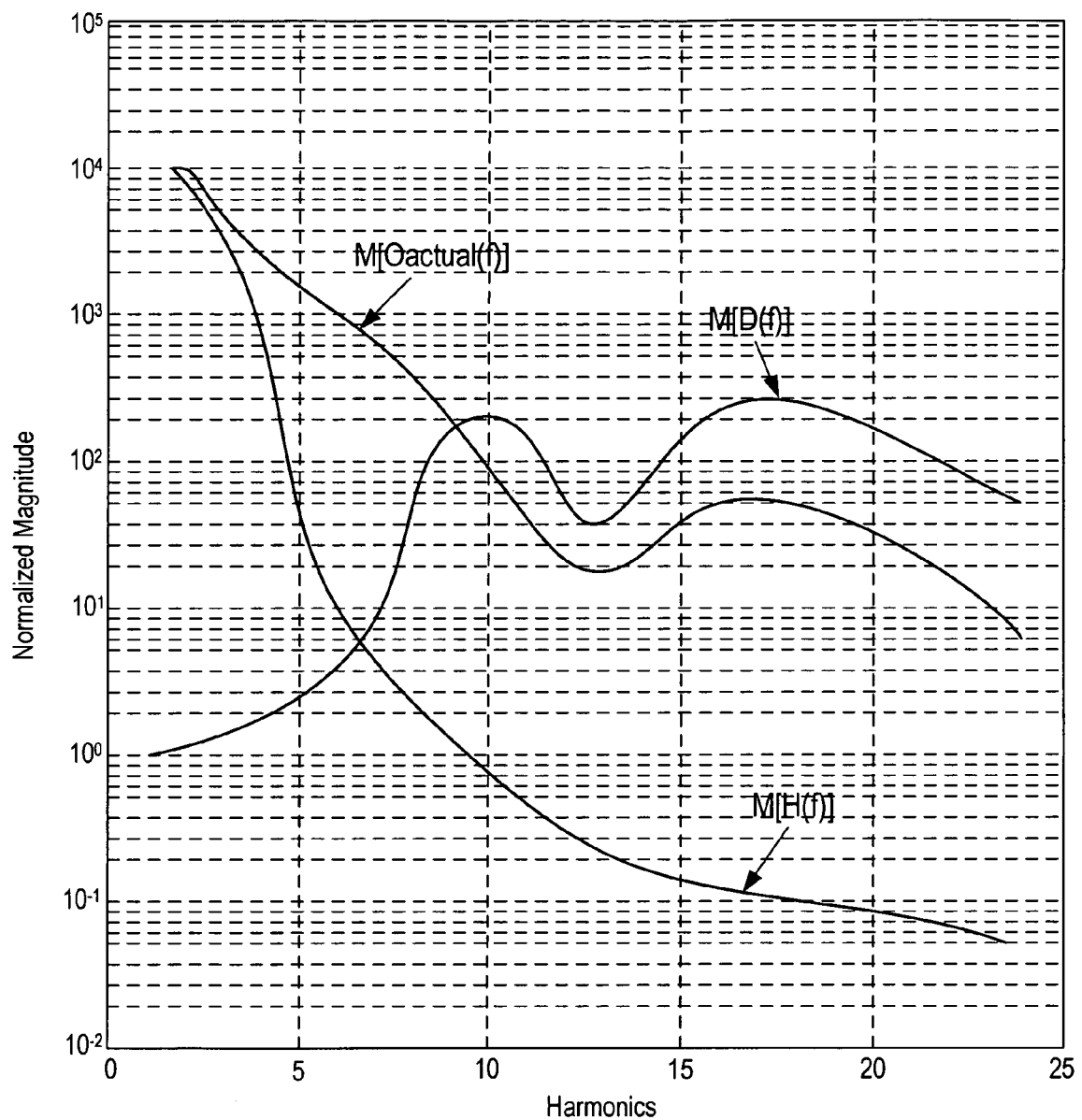
FIG. 12 is a frequency-domain plot of the magnified responses of the reflector, reflector drive signal, and actual reflector output for the system of FIG. 11 according to an embodiment.

FIG. 12 is a frequency-domain plot of the magnitude responses M[D(f)], M[$O_{actual}$(f)], and M[H(f)] that the system 40 may achieve after a successful execution of the calibrating mode according to an embodiment of the invention. That is, M[D(f)] is the magnitude response of the drive signal D(f) generated by the final coefficients stored in the table 50 (FIG. 11) at the end of the calibrating mode, M[$O_{actual}$(f)] is the magnitude of the reflector output response in the vertical dimension when the reflector 12 is driven by D(f), and [H(f)] is the magnitude response of the reflector as calculated by the harmonic-coefficient calculator 64. These responses are respectively similar to the magnitude responses M[H(f)], M[$O_{target}$(f], and M[D(f)] that are plotted in FIGS. 5, 7, and 8, respectively.

Figure 13:
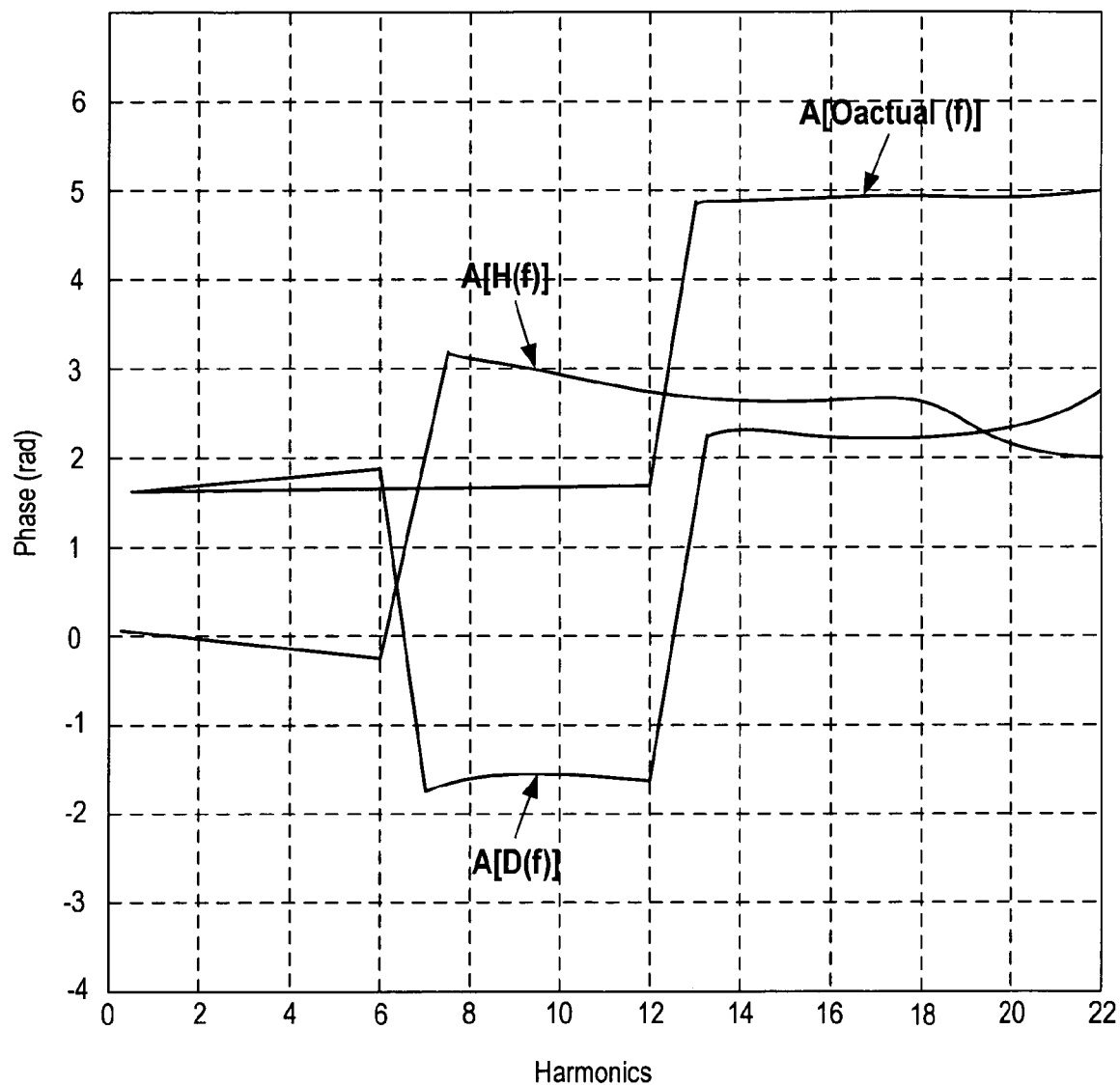
FIG. 13 is a frequency-domain plot of the phase responses of the reflector, reflector drive signal, and actual reflector output for the system of FIG. 11 according to an embodiment.

FIG. 13 is a frequency-domain plot of the phase responses A[D(f)], A[$O_{actual}$(f)], and A[H(f)], which respectively correspond to the magnitude responses M[D(f)], M[$O_{actual}$(f)], and M[H(f)] plotted in FIG. 12 according to an embodiment of the invention.

Referring back to FIG. 11, alternate embodiments of the calibrating mode are contemplated. For example, where the drive-signal generator 48 includes an IFFT, then the system 40 may omit the harmonic-coefficient extractor 62, such that the harmonic-coefficient calculator 64 operates directly on the phasor coefficients from the FFT 60. Furthermore, to distribute the processing load, where a processor implements some or all functions of the driver 42 and calibrator 44, the calibrator may correct only one set of coefficients, magnitude or phase, at a time. For example, the calibrator 44 may first execute the above-described calibrating routine for only the phase coefficients until the differences between all pairs of A[$D_{new}$(nF)] and A[D(nF)] meet their respective threshold requirements, and then execute the calibrating routine for only the magnitude coefficients until the differences between all pairs of M[$D_{new}$(nF)] and M[D(nF)] meet their respective threshold requirements. In addition, the calibrator 44 may use the threshold detector 66 during the calibrating mode as discussed below.

Image-Scanning Mode

Still referring to FIG. 11, the image-scanner system 40 operates in the image-scanning mode according to an embodiment of the invention at some time after it exits the calibrating mode.

During the image-scanning mode, the driver 42 drives the reflector 12 with the tuned analog drive signal D, which causes the reflector to sweep the image beam 22 (FIG. 1) in the vertical dimension.

Furthermore, the threshold detector 66 monitors the output response $O_{actual}$ of the reflector 12 and causes the calibrator 44 to retune the harmonic coefficients of D if and when $O_{actual}$ drifts more than a predetermined "distance" away from the target output response $O_{target}$.

Specifically, the threshold detector 66 measures and compares one or more characteristics of the reflector output response $O_{actual}$ with threshold values for these characteristics. Based on the relationship between the measured characteristic(s) and corresponding threshold value(s), the detector 66 determines whether or not $O_{actual}$ is satisfactory.

In one example, the threshold detector 66 first determines the velocity in the vertical dimension of the beam 22 (FIG. 1), which is swept by the reflector 12, as a function of time during the beam-sweep period $T_{sweep}$ (FIG. 2). The detector 66 may determine this vertical-sweep velocity by conventionally taking the first derivative of $F_v$ between times t1 and t2 (FIG. 2), or in any other known manner. For example, the threshold detector 66 may include a $4^{th}$-order IIR filter (not shown) that determines the vertical-sweep velocity.

Next, the threshold detector 66 calculates the velocity ripple, which is the standard deviation in the determined vertical-sweep velocity, and compares the calculated ripple to a predetermined threshold value, such as 4500—it has been empirically determined that the human eye typically does not detect image artifacts caused by a velocity ripple that is less than 4500.

If the velocity ripple is less than the predetermined threshold value, then the threshold detector 66 generates a signal CALIBRATE having an inactive logic level that causes the FFT 60, harmonic-coefficient extractor 62, and harmonic-coefficient calculator 64 to remain inactive and the system 40 to remain in the image-scanning mode.

Conversely, if the velocity ripple equals or exceeds the predetermined threshold value, then the threshold detector 66 generates the signal CALIBRATE having an active logic level that causes the calibrator 44 to enter the system 40 into the recalibration mode (discussed below), during which the calibrator 44 retunes the harmonic coefficients of D(t).

Alternative embodiments of the image-scanning mode are contemplated. For example, the threshold detector 66 may be omitted, and the calibrator 44 may operate as it does in the above-described calibrating mode and continually retune the harmonic coefficients of D(t) as needed.

Recalibrating Mode

Still referring to FIG. 11, the system 40 enters the recalibrating mode in response to the threshold detector 66 generating an active logic level for the signal CALIBRATE as discussed above. During the recalibrating mode, the calibrator 44 retunes the harmonic-coefficients of D(t) such that the actual output response $O_{actual}$ of the reflector 12 is maintained within a predetermined "distance" of the target output response $O_{target}$.

In response to an active level for CALIBRATE, the calibrator 44 first enters a phase-coefficient portion of a recalibrating routine, during which the calibrator attempts to correct errors in the phase coefficients of the harmonics of D(t) as discussed above in conjunction with the calibrating mode. To prevent the calibrator 44 from entering an infinite execution loop where differences between the new and current phase coefficients cannot be made to meet the respective threshold requirements, the calibrator 44 executes this phase-coefficient portion of the calibrating routine for only a predetermined number of times, for example, ten times.

If after the phase-coefficient portion of the recalibrating routine all of the phase coefficients for the harmonics of D(t) meet their respective threshold requirements, then the calibrator 44 enters a magnitude-coefficient portion of the recalibrating routine during which the calibrator attempts to correct errors in the magnitude coefficients of the harmonics of D(t) as discussed above in conjunction with the calibrating mode, and may adjust the threshold(s) of the threshold detector 66. In one example where the threshold detector 66 measures velocity ripple, the calibrator 44 executes the magnitude-coefficient portion of the recalibrating routine once, then causes the threshold detector 66 to recalculate the velocity ripple in $O_{actual}$ during the period $T_{sweep}$ (FIG. 2). If the velocity ripple has decreased below the level that triggered the threshold detector 66 to generate an active level for CALIBRATE, then the harmonic-coefficient calculator 64 performs no further calibration. Furthermore, the calibrator 44 replaces the original predetermined threshold value, such as 4500, with the newly measured velocity ripple plus a predetermined expansion value such as 500. This new threshold value may be lower or higher than the original threshold value. As discussed below, allowing an increase in the velocity-ripple threshold prevents a situation where the calibrator 44 would be unable to cause the velocity ripple of $O_{actual}$ to meet the threshold requirement imposed by the threshold detector 66. If, however, the velocity ripple has not decreased below the trigger value, then the calibrator 44 continues executing the magnitude-coefficient portion of the recalibrating routine until the velocity ripple decreases below the trigger value or for a predetermined maximum number of times, for example ten times.

But if after the phase-coefficient portion of the recalibrating routine not all of the phase coefficients for the harmonics of D meet their respective threshold requirements, or if after the magnitude-coefficient portion of the recalibrating routine the velocity ripple has not improved, then the calibrator 44 recalibrates the velocity-ripple threshold. Specifically, the calibrator 44 causes the threshold detector 66 to again determine the velocity ripple in $O_{actual}$ during the sweep period $T_{sweep}$ (FIG. 2). Then, the calibrator 44 replaces the original predetermined threshold value with the newly measured velocity ripple plus the predetermined expansion value.

The calibrator 44 repeats the recalibrating procedure whenever the threshold detector 66 detects that the reflector output response $O_{actual}$ falls outside of the predetermined "distance" from the target response $O_{target}$.

It has been found that a reduction of the reflector velocity ripple below a value of 2500 provides no noticeable improvement in the quality of a scanned image, and that a velocity ripple above a value of 6000 renders the quality of a scanned image too low for most applications. But in the absence of an external disturbance such as a strong vibration or magnetic field, the calibrator 44 can typically retune the harmonic-coefficients of the drive signal D(t) such that the velocity ripple of the reflector 12 is well below 6000.

Alternate Embodiment of the Calibrating Mode Using the Threshold Detector 66

Still referring to FIG. 11, in this embodiment the harmonic-coefficient calculator 64 calculates non-zero magnitude coefficients for only the first twenty four AC harmonics F-24F of D(t) as discussed above.

First, the calibrator 44 tunes the phase coefficients of the harmonics of D(t) by correcting the phase errors $A[D_{new}(nF)]-A[D(nF)]$ by ½ for each pass through the calibrating routine until the phase differences for the first ten harmonics F-10F of D(t) are each less than ±0.5 radians and the phase differences for harmonics 11F-24F are each less than ±0.3 radians.

Next, the calibrator 44 tunes the magnitude coefficients of the harmonics of D(t) by correcting the magnitude errors $M[D_{new}(nF)]-M[D(nF)]$ by ⅓ for each pass through the calibrating routine until the threshold detector 66 indicates that the velocity ripple is less than a predetermined threshold.

Then, the drive-signal generator 48 generates the drive signal D from the tuned harmonic coefficients stored in the table 50, and loads samples of D into the table 52. As discussed above, during the image-scanning mode the generator 48 generates D by clocking the samples from the table 52 to the DAC 53.

Alternate Embodiments of the Invention

Figure 14:
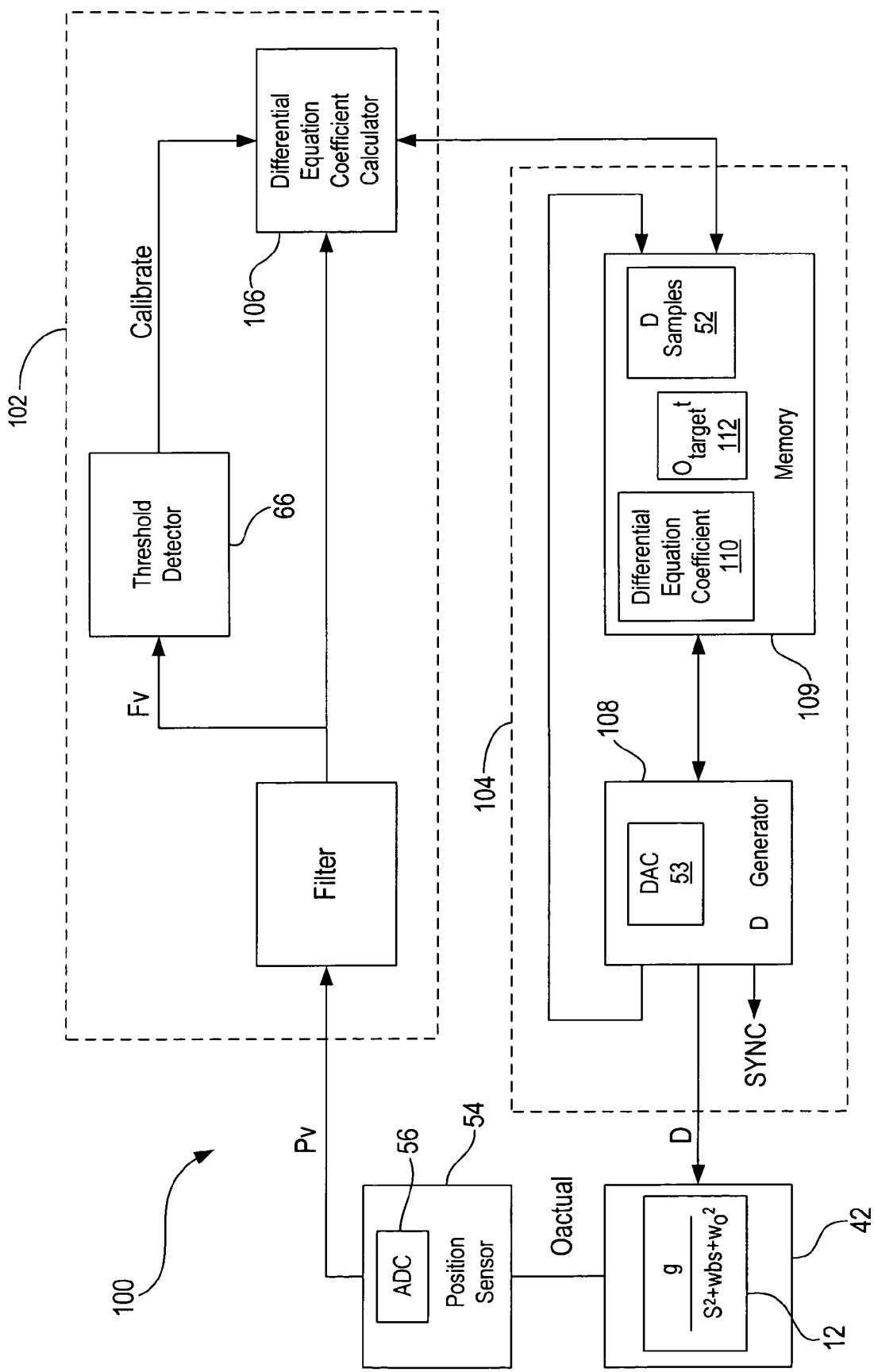
FIG. 14 is a functional block diagram of an image-scanning system that includes a reflector, such as the reflector of FIG. 1, drive circuit for driving the reflector, and a circuit for calibrating the drive circuit according to another embodiment.

FIG. 14 is a functional block diagram of an image-scanning system 100 according to an embodiment of the invention. The system 100 is similar to the system 40 of FIG. 11 except that in the system 100, a calibrator 102 replaces the calibrator 44 of the system 40, and a drive circuit 104 replaces the drive circuit 42 of the system 40. In the calibrator 102, a differential-equation-coefficient calculator 106 replaces the FFT 60, harmonic-coefficient extractor 62, and the harmonic-coefficient calculator 64 of the calibrator 44. In the drive circuit 104, a drive-signal generator 108 and a memory 109 replace the generator 48 and the memory 46 of the driver 44. And in the memory 109, a differential-equation-coefficient table 110 replaces the table 50 and an $O_{target}(t)$ table 112 is added. As discussed below, instead of tuning the magnitude and phase coefficients of the harmonics that compose D(t), the calculator 102 tunes the coefficients of a second-order differential equation that represents D(t). Because the number of these differential-equation coefficients is typically less than the number of harmonic coefficients that the calculator 64 (FIG. 11) calculates, the calculator 106 may be less complex than the calculator 64. For the same reason, the drive-signal generator 108 may be less complex than the generator 48 (FIG. 11). Furthermore, because there are fewer coefficients to store, the coefficient table 110 may be smaller than the table 50 (FIG. 11).

Theory Upon Which the Alternate Embodiments are Based

It has been discovered that one can mathematically model the reflector 12 of FIG. 1 as a resonant spring-mass plant—for beams sweeping in the vertical dimension, the torsion arms 16a and 16b correspond to the plant's spring, and the reflector 12 corresponds to the plant's mass—having an s-domain response H(s) per the following equation:

$$H(s) = \frac{g}{s^2 + \omega_b s + \omega_0^2} \quad (22)$$

where H(s) is the Laplace Transform of the time-domain response H(t), g is the gain of the plant, $\omega_b$ is the damping factor of the plant, and $\omega_0$ is the resonant frequency of the plant. Because the Laplace Transform is known, a detailed discussion is omitted for brevity. But the domain of the Laplace operator s is related to the frequency domain; therefore, one can relate a driving waveform D(s), the plant response H(s), and the output response O(s) when H(s) is driven by D(s), according to the following equation, which is similar to equation (1):

$$O(s) = D(s) \times H(s) \quad (23)$$

Because the s operator accounts for both magnitude and phase, separate magnitude and phase coefficients (as in equations (1) and (2)) are not needed.

From equations (22) and (23), one can derive the following representation of the actual output response $O_{actual}(s)$ of the reflector 12 (FIG. 1) when the reflector is driven by D(s):

$$O_{actual}(s) = \frac{D(s) g_{actual}}{s^2 + \omega_{bactual} s + \omega_{0actual}^2} \quad (24)$$

where $g_{actual}$, $\omega_{bactual}$, and $\omega_{0actual}$ are the coefficients that represent the actual response H(s) of the reflector 12 (FIG. 1). But as discussed above in conjunction with the system 40 of FIG. 11, before calibration of the system 100, one typically has only an estimate of these coefficients. Therefore, one can relate the actual coefficient values to the estimated coefficient values according to the following equations:

$$g_{actual} = g_{estimate} + a \quad (25)$$

$$\omega_{bactual} = \omega_{bestimate} + b \quad (26)$$

$$\omega_{0actual}^2 = \omega_{0estimate}^2 + c \quad (27)$$

where $g_{estimate}$, $\omega_{bestimate}$, and $\omega_{0estimate}^2$ are the estimated coefficients, and a, b, and c are the respective errors in these estimated coefficients. As discussed below, one function of the differential-equation-coefficient calculator 106 is to tune $g_{estimate}$, $\omega_{bestimate}$, and $\omega_{0estimate}^2$ such that ideally, a=b=c=0, or, more practically such that a, b, and c are each smaller than a respective predetermined threshold.

Furthermore, from equation (23), one can derive the following expression for D(s) generated by the drive-signal generator 108:

$$D(s) = O_{target}(s) / H_{estimate}(s) = \frac{O_{target}(s)(s^2 + \omega_{bestimate} s + \omega_{0estimate}^2)}{g_{estimate}} \quad (28)$$

And, from equations (24)-(28), one obtains the following expression:

$$O_{actual}(s) = \frac{O_{target}(s)(s^2 + \omega_{bestimate} s + \omega_{0estimate}^2)}{g_{estimate}} \times \frac{(g_{estimate} + a)}{s^2 + (\omega_{bestimate} + b)s + \omega_{0estimate}^2 + c} \quad (29)$$

One can simplify equation (29) as follows:

$$g_{estimate}(s^2 + (\omega_{bestimate} + b)s + \omega_{0estimate}^2 + c) O_{actual}(s) = \quad (30)$$
$$(g_{estimate} + a)(s^2 + \omega_{bestimate} + \omega_{0estimate}^2) O_{target}(s)$$

$$g_{estimate} O_{actual}(s) s^2 + g_{estimate}(\omega_{bestimate} + b) O_{actual}(s) s + \quad (31)$$
$$g_{estimate}(\omega_{0estimate}^2 + c) O_{actual}(s) = (g_{estimate} + a) O_{target}(s) s^2 +$$
$$(g_{estimate} + a)\omega_{bestimate} s O_{target}(s) + (g_{estimate} + a)\omega_{0estimate}^2 O_{target}(s)$$

$$[g_{estimate} O_{actual}(s) - (g_{estimate} + a) O_{target}(s)] \quad (32)$$
$$s^2 + [g_{estimate}(\omega b_{estimate} + b) O_{actual}(s) -$$
$$(g_{estimate} + a)\omega b_{estimate} O_{target}(s)]s + [g_{estimate}(\omega 0 2_{estimate} + c)$$
$$O_{actual}(s) - (g_{estimate} + a)\omega_{0estimate}^2 O_{target}(s)] = 0$$

A known property of the Laplace Transform is that for $\Im(t=0)=0$, $$sPf(s) = \frac{Pd f(t)}{dt}.$$

That is, $s^h$ represents $$\frac{d^h f(t)}{dt}.$$

Furthermore, for the reflector 12, $O_{actual}(t)$ is the actual position of the swept beam 22 (FIG. 1) with respect to time, $$\frac{d}{dt} O_{actual}(t)$$

is the actual velocity of the beam 22 with respect to time, and $$\frac{d^2}{dt^2} O_{actual}(t)$$

is the actual acceleration of the beam 22 with respect to time. Similarly, $O_{target}(t)$, $$\frac{d}{dt} O_{target}(t), \text{ and } \frac{d^2}{dt^2} O_{target}(t)$$

are, respectively, the target position, velocity, and acceleration of the beam 22 with respect to time. From these relationships one can derive the following expression:

$$[g_{estimate}O''_{actual}(t) - (g_{estimate} + a)O''_{target}(t)] + [ \qquad (33)$$

$$g_{estimate}(\omega b_{estimate} + b)O'_{actual}(t) -$$

$$(g_{estimate} + a)\omega b_{estimate}O'_{target}(t)] + [g_{estimate}(\omega 0^2_{estimate} + c)$$

$$O_{actual}(t) - (g_{estimate} + a)\omega 0^2_{estimate}O_{target}(t)] = 0$$

Where $$O''(t) = \frac{d^2O(t)}{dt} \text{ and } O'(t) = \frac{dO(t)}{dt}$$

One solution to equation (33) is where each bracketed term equals zero, i.e., accelerations cancel, velocities cancel, and positions cancel. Solving for a in this manner results in:

$$a = \frac{g_{estimate}(O''_{actual}(t) - O''_{target}(t))}{O''_{target}(t)} \qquad (34)$$

Equation (34) indicates that the error a is proportional to the difference $O''_{actual}(t)-O''_{target}(t)$, which is the difference between the actual and target accelerations of the beam 22 swept by the reflector 12 (FIG. 1). Therefore, the calibrator 102 can calculate a value for a based on this acceleration difference, tune $g_{estimate}$ accordingly, and repeat this procedure until $g_{estimate}$ equals or approximately equals $g_{actual}$. That is, as $g_{estimate}$ approaches $g_{actual}$, $O''_{actual}(t)$ approaches $O''_{target}(t)$, and the acceleration difference, and thus the error a, will converge toward zero. The calibrator 102 halts the iterative calculation for a when the acceleration difference $O''_{actual}(t)-O''_{target}(t)$ is less than a predetermined acceleration-error threshold.

Similarly solving for b results in:

$$b = \frac{g_{estimate}\omega_{bestimate}(O'_{target}(t) - O'_{actual}(t)) + a\omega_{bestimate}O'_{target}(t)}{g_{estimate}O'_{actual}(t)} \qquad (35)$$

So assuming that a converges toward zero via iterations of equation (34), b is proportional to the difference $O'_{target}(t)-O'_{actual}(t)$ between the target and actual velocities of the beam 22 swept by reflector 12 (FIG. 1). Therefore, the calibrator 102 can iteratively calculate a value for b based on this velocity difference until $\omega_{bestimate}$ equals or approximately equals $\omega_{bactual}$. That is, as $\omega_{bestimate}$ approaches $\omega_{bactual}$, $O'_{actual}(t)$ approaches $O'_{target}(t)$, and the velocity difference, and thus the error b, will converge toward zero. The calibrator 102 halts the iterative calculation for b when the velocity difference is less than a predetermined velocity-error threshold.

Likewise, solving for c results in:

$$c = \frac{g_{estimate}\omega_0^2{}_{estimate}(O_{target}(t) - O_{actual}(t)) + a\omega_0^2{}_{estimate}O_{target}(t)}{g_{estimate}O_{actual}(t)} \qquad (36)$$

So assuming that a converges toward zero via iterations of equation (34), c is proportional to the difference $O_{target}(t)-O_{actual}(t)$ between the target and actual positions of the beam 22 swept by the reflector 12 of FIG. 1. Therefore, the calibrator 102 can iteratively calculate a value for c based on this position difference until $\omega_0^2{}_{estimate}$ equals or approximately equals $\omega_0^2{}_{actual}$. That is, as $\omega_0^2{}_{estimate}$ approaches $\omega_0^2{}_{actual}$, $O_{actual}(t)$ approaches $O_{target}(t)$, and the position difference, and thus the error c, will converge toward zero. The calibrator 102 halts the iterative calculation for c when the position difference is less than a predetermined position-error threshold.

Equations (22)-(36) assume continuous signals for D(t), $O_{actual}(t)$, and $O_{target}(t)$. But as discussed below, one can derive from these continuous-signal equations corresponding equations for digital signals having N discrete intervals per period T. The corresponding digital-signal equation for a is:

$$a = \sum_{k=0}^{N-1}[\text{scale\_a}]w_a[k](O''_{actual}(kT/(N-1)) - O''_{target}(kT/(N-1))) \qquad (37)$$

where $w_a[k]$ is a respective weighting value for the $k^{th}$ interval and can equal or otherwise account for the known factor $g_{estimate}/O''_{target}(t)$ of equation (34) scaled by 1/N, or can be empirically determined as discussed below in conjunction with FIG. 15. Scale_a is a scaling factor that is between zero and one inclusive, and can lower the effective gain of the calibrating loop, and thus increase its stability, so that $O''_{actual}(t)$ converges toward $O''_{target}(t)$ with little or no oscillation as discussed above in conjunction with FIG. 11 for the system 40. The corresponding digital-signal equations for b and c are:

$$b = \sum_{k=0}^{N-1}[\text{scale\_b}]w_b[k](O'_{target}(kT/(N-1)) - O'_{actual}(kT/(N-1))) \qquad (38)$$

$$c = \sum_{k=0}^{N-1}[\text{scale\_c}]w_c[k](O_{target}(kT/(N-1)) - O_{actual}(kT/(N-1))) \qquad (39)$$

Figure 15:
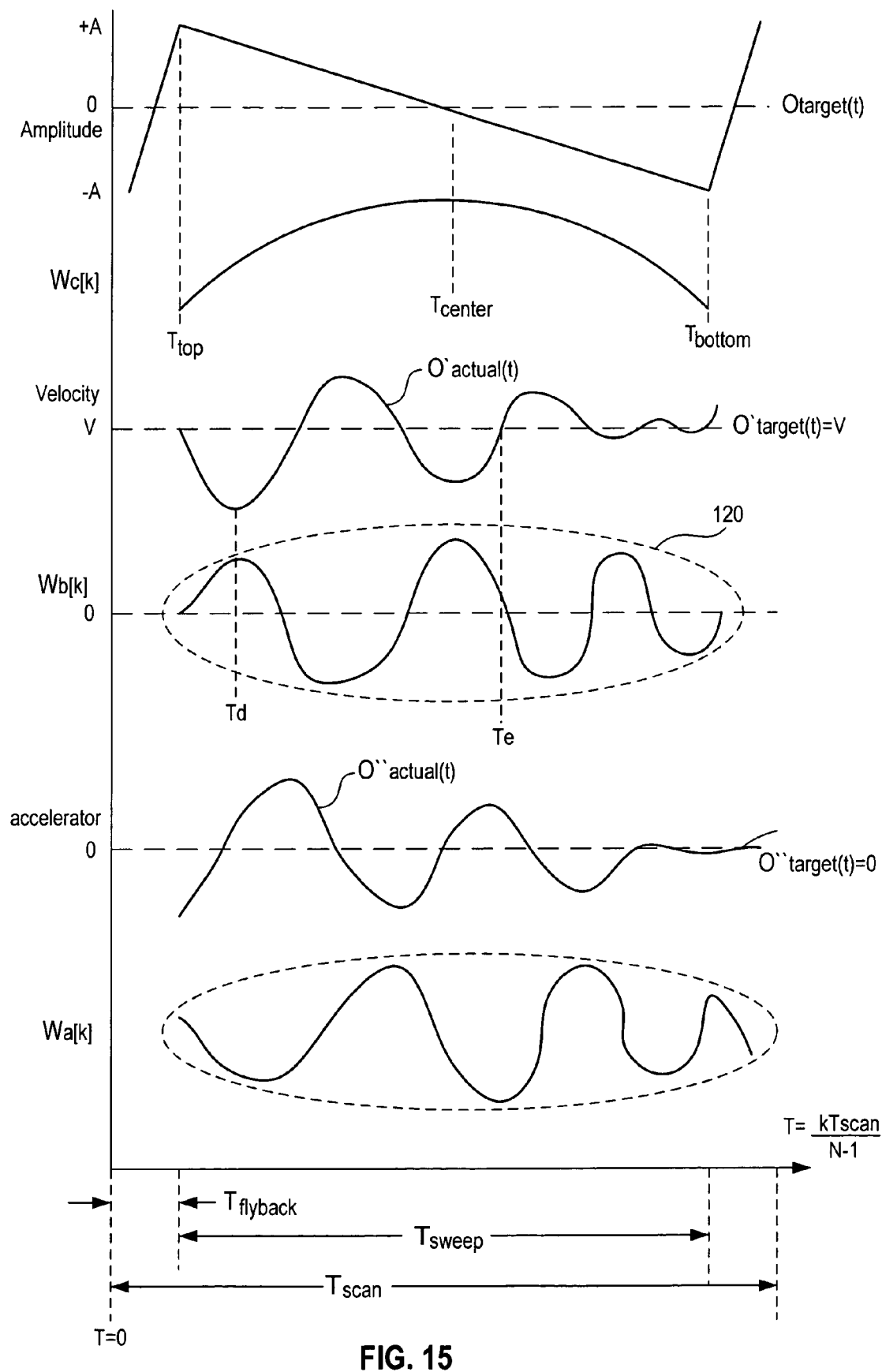
FIG. 15 is a time-domain plot of the $0^{th}$, $1^{st}$, and $2^{nd}$ derivatives of an actual output response of the reflector of FIG. 14 and of corresponding weighting functions used to modify coefficients of a polynomial equation that represents the frequency response of the reflector according to an embodiment.

FIG. 15 is a plot of $O''_{target}(t)$, $O'_{target}(t)$, $O_{target}(t)$, and empirically determined weighting functions $w_a[k]$, $w_b[k]$, and $w_c[k]$ according to an embodiment of the invention. For purposes of determining $w_a[k]$, $w_b[k]$, and $w_c[k]$, $O_{target}(t)$ is the response of FIG. 2. It is also assumed that errors in the beam acceleration, velocity, and position near the center of the scanned image cause visual artifacts that are more noticeable than do such errors toward the top and bottom of the scanned image, and that the major deviation of $O_{actual}(t)$ from $O_{target}(t)$ is the "ringing" of the reflector 12 (and thus of the swept beam) at the resonant frequency $\omega_0$. Furthermore, because the swept beam 22 (FIG. 1) is "off" during the flyback period $T_{flyback}$, errors in the beam acceleration, velocity, and position during $T_{flyback}$ cause, no image artifacts. Consequently, $w_a[k]=w_b[k]=w_c[k]=0$ during $T_{flyback}$.

$w_c[k]$ is a half sinusoid with a maximum in the center $T_{center}$ of the beam-sweep period $T_{sweep}$, when the beam 22 (FIG. 1) is targeted to be at the vertical center of the image, and with minimum values at the beginning $T_{top}$ and the end $T_{bottom}$ of $T_{sweep}$, when the beam is targeted to be at the top and bottom of the image, respectively. That is, the gain of $w_c[k]$ is greatest at the vertical center $T_{center}$, where one wishes to minimize the position difference $O_{actual}(t)-O_{target}(t)$, and is least at the top $T_{top}$ and bottom $T_{bottom}$ of the image where one is less concerned about beam-position errors.

$W_b[k]$ has a half-sinusoid correction envelope 120 with a maximum at the vertical center $T_{center}$ of the image and minimums at the top and bottom $T_{top}$ and $T_{bottom}$ of the image. But within the envelope 120, $w_b[k]$ is sinusoidal like the velocity would be if the reflector 12 "rings" at $f=\omega_o/2\pi$. The sinusoidal $w_b[k]$ is higher where greater velocity errors are expected, and lower where smaller velocity errors are expected. For example, at time td, the actual "ringing" velocity $O'_{actual}(t)$ has a maximum negative deviation from the target velocity $O'_{target}(t)$, which is a constant V in this example. Therefore, $w_b[k=td]$ has a relatively high value of opposite polarity to $O'_{actual}(t=t_d)$ to reduce the velocity error at $t_d$. Conversely, at time $t_e$, the actual velocity $O'_{actual}(t=t_e)$ has a zero crossing, and thus a minimum deviation from the target velocity $O'_{target}(t=t_d)=V$. Therefore, $w_b[k]$ has a relatively low value, here zero, since little velocity deviation is expected at time $t_e$.

$W_a[k]$ is calculated in a manner similar to that described for $w_b[k]$, it being known that in a spring-mass plant like the reflector 12 of FIG. 1, the acceleration leads the velocity by 90°.

Figure 16:
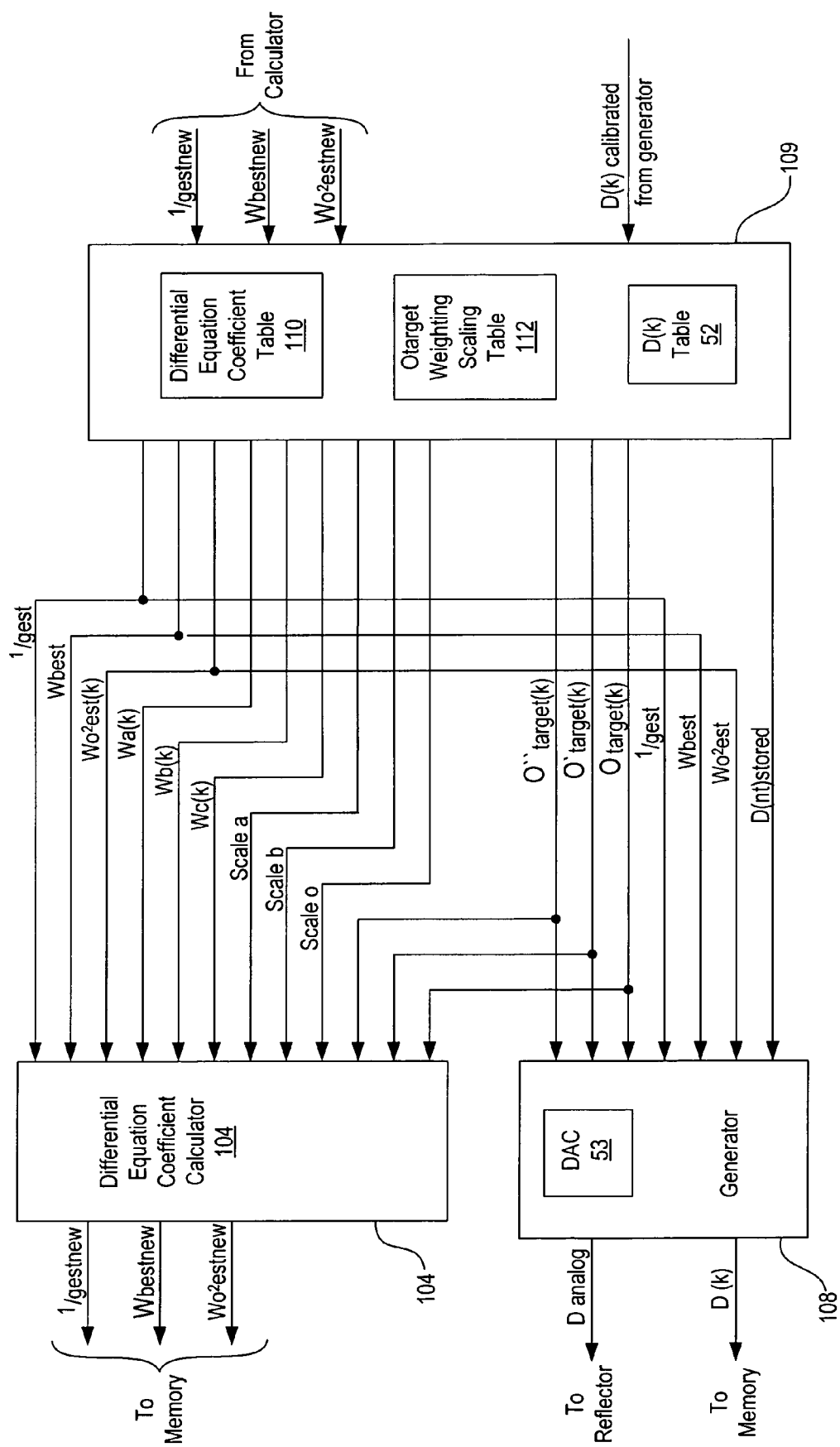
FIG. 16 is a functional block diagram showing quantities passed among the memory, drive-signal generator, and coefficient calculator of FIG. 14 according to an embodiment.

FIG. 16 is a block diagram showing how values from equations (25)-(39) are generated by and propagated among the memory 109, differential-equation coefficient calculator 104, and drive-signal generator 108 according to an embodiment of the invention.

Figure 17:
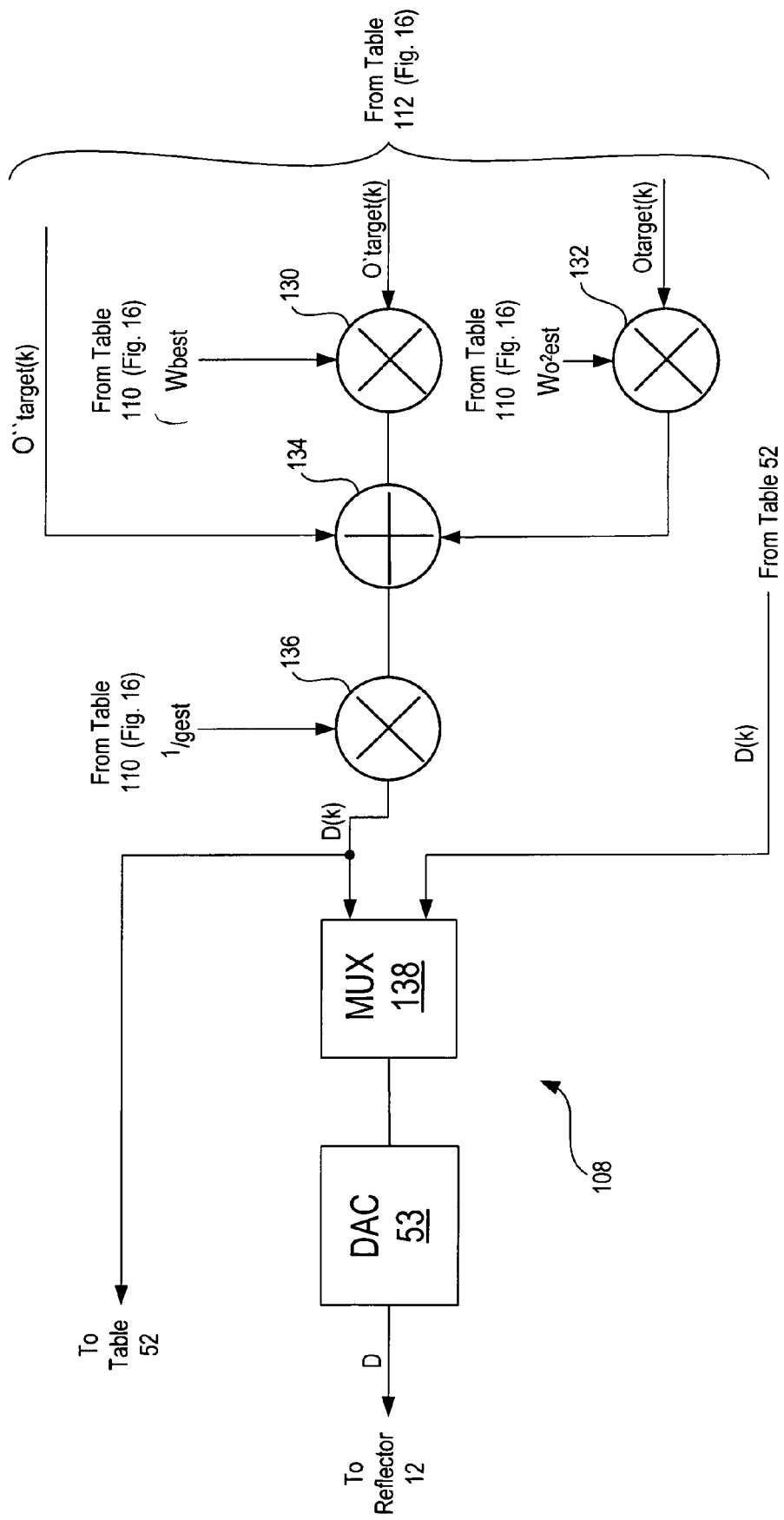
FIG. 17 is a functional block diagram of the drive signal generator of FIGS. 14 and 16 according to an embodiment.

FIG. 17 is a functional block diagram of the drive-signal generator 108 of FIGS. 14 and 16 according to an embodiment of the invention.

Figure 18:
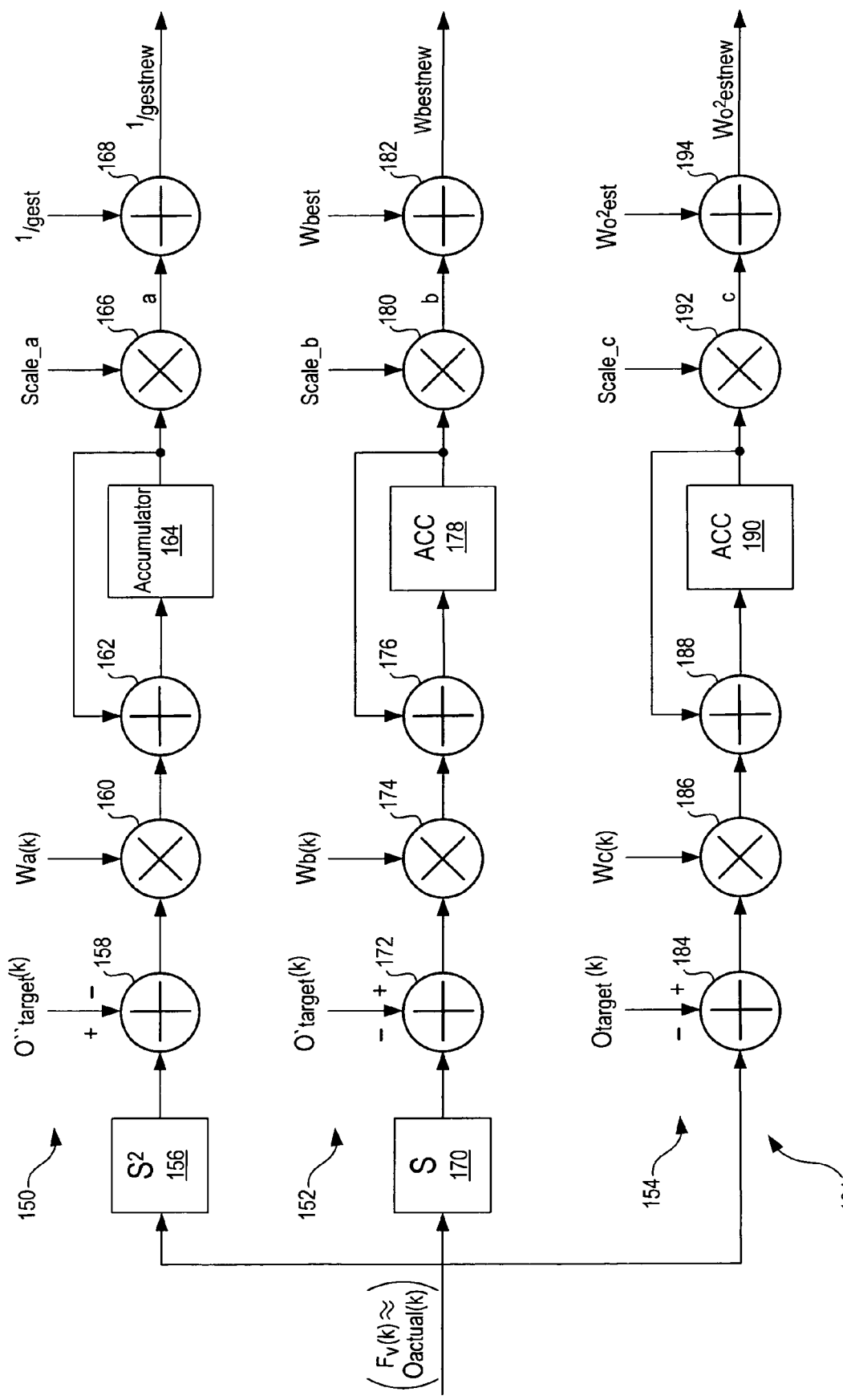
FIG. 18 is a functional block diagram of the coefficient calculator of FIGS. 14 and 16 according to an embodiment.

FIG. 18 is a functional block diagram of the differential-equation-coefficient calculator 104 of FIGS. 14 and 16 according to an embodiment of the invention.

Referring to FIGS. 14 and 16-18, the operation of the system 100 is discussed according to an embodiment of the invention. In this embodiment, the image-scanning system 100, like the image-scanning system 40, has three operating modes: a calibrating mode, an image-scanning mode, and a recalibrating mode.

Calibrating Mode

A manufacturer of the image-scanning system 100 typically runs the system in the calibrating mode to tune the differential-equation coefficients of the drive signal D before shipping the system (or a product that incorporates the system) to a customer.

First, referring to FIG. 16, the manufacture loads into the table 130 of the memory 109 estimated coefficients $1/g_{estimate}$, $\omega_{bestimate}$, and $\omega_{0 2estimate}$, and loads into the table 112 the predetermined values $O''_{target}(k)$, $O'_{target}(k)$, and $O_{target}(k)$, $w_a[k]$, $w_b[k]$, $w_c[k]$, scale-a, scale-b, and scale-c for $k=0 \rightarrow N-1$. The estimated coefficients $1/g_{estimate}$, $\omega_{bestimate}$, and $\omega_0 2_{estimate}$ may be those of a driving signal that was previously calculated for another reflector that is similar to the reflector 12 (FIG. 1). Alternatively, these estimated coefficients may be determined from a computer characterization of the reflector 12 or in any other suitable manner. The predetermined target values $O''_{target}(k)$, $O'_{target}(k)$, and $O_{target}(k)$ may be generated by mathematical analysis of the target response $O_{target}(t)$ of FIG. 2 or in any other suitable manner.

Then, referring to FIGS. 14, 16 and 17, the drive-signal generator 108 generates the drive signal D (according to equation (28)) from the estimated coefficients $1/g_{estimate}$, $\omega_{bestimate}$, and $\omega_0 2_{estimate}$ and the predetermined target values $O''_{target}(k)$, $O'_{target}(k)$, and $O_{target}(k)$ stored in the tables 110 and 112, respectively, and D drives the reflector 12 (FIG. 1) in the vertical dimension. Specifically, during each interval k from $k=0 \rightarrow N-1$, the generator 108 sequentially loads from the tables 110 and 112, respectively, $1/g_{estimate}(k)$, $\omega_{bestimate}(k)$, and $\omega_0^2{}_{estimate}(k)$, and $O''_{target}(k)$, $O'_{target}(k)$ and $O_{target}(k)$. In a pipelined fashion, a multiplier 130 generates the product $\omega_{bestimate}(k)O'_{target}(k)$, a multiplier 132 generates the product $\omega_0^2{}_{estimate}(k)O_{target}(k)$, and an adder 134 generates the sum $O''_{target}(k)+\omega_{bestimate}(k)O'_{target}(k)+\omega_0^2{}_{estimate}(k)O_{target}(k)$. A multiplier 146 generates the product of this sum and $1/g_{estimate}(k)$, and this product equals a component D(k) of the digital drive signal D. A multiplexer 138 couples D(k) to the DAC 53, which converts D(k) into a corresponding component of the analog drive signal D, which drives the reflector 12.

Next, referring to FIG. 14 and as discussed above in conjunction with FIG. 11, the position sensor 54 generates the digital reflector-position signal $P_v$. The signal $P_v$ includes N digital samples per period $T_{scan}$ (FIG. 2) of the actual reflector output response $O_{actual}$.

Then, as discussed above in conjunction with FIG. 11, the filter 58 generates the filtered reflector-position signal $F_v$ from the signal $P_v$.

Next, referring to FIGS. 14, 16 and 18, the differential-equation-coefficient calculator 104 calculates new estimated coefficients $1/g_{estimatenew}(k)$, $\omega_{bestimatenew}(k)$, and $\omega_0^2{}_{estimatenew}(k)$ and stores them in the coefficient table 110.

Specifically, referring to FIG. 18, the calculator 104 includes three channels 150, 152, and 154, which respectively calculate the error values a, b, and c according to equations (37)-(39), respectively, and add these error values to $1/g_{estimate}(k)$, $\omega_{bestimate}(k)$, and $\omega_0^2{}_{estimate}(k)$ to generate new estimated coefficients $1/g_{estimatenew}(k)$, $\omega_{bestimatenew}(k)$, and $\omega_0^2{}_{estimatenew}(k)$.

First, during each interval k, the calculator 104 sequentially loads from the table 112 $O''_{target}(k)$, $O'_{target}(k)$, $O_{target}(k)$, $w_a(k)$, $w_b(k)$, $w_c(k)$, scale_a, scale_b, and scale_c, and loads from the table 110 $1/g_{estimate}(k)$, $\omega_{bestimate}(k)$, and $\omega_0^2{}_{estimate}(k)$.

Next, referring to the channel 150 and equation (37), in pipelined fashion a block ($s^2$) 156 conventionally generates the second derivative (acceleration) $O''_{actual}(k)$ from $F_v(k)$, and an adder 158 generates the beam-acceleration error $O''_{actual}(k)-O''_{target}(k)$. A multiplier 160 generates the weighted beam-acceleration error $w_a(k)(O''_{actual}(k)-O''_{target}(k))$, and an adder 162 and an accumulator 164 generate the sum of the weighted beam-acceleration errors from $k=0 \rightarrow N-1$. The calculator 104 then compares the sum of the weighted beam-acceleration errors to a predetermined beam-acceleration threshold (comparator not shown in FIG. 18). If the sum of the weighted beam-acceleration errors is less than the predetermined threshold, then the calculator 104 halts the tuning of $1/g_{estimate}$. But if the sum of the weighted beam-acceleration errors is greater than or equal to the predetermined threshold, then a multiplier 166 generates the error a equal to the product of the sum of the weighted beam-acceleration errors and scale_a, and an adder 168 generates the new estimated coefficient $1/g_{estimatenew}$ equal to the sum of a and the current estimated coefficient $1/g_{estimate}$. The channel 150 then stores $1/g_{estimatenew}$ in the coefficient table 110 in place of $1/g_{estimate}$. Consequently, $1/g_{estimatenew}$ becomes the new current estimated coefficient $1/g_{estimate}$.

Similarly, referring to the channel 152 and equation (38), a block (s) 170 conventionally generates the first derivative (velocity) $O'_{actual}(k)$ from the signal $F_v(k)$, and an adder 172 generates the beam-velocity error $O'_{target}(k)-O'_{actual}(k)$. A multiplier 174 generates the weighted beam-velocity error $w_b(k)(O'_{target}(k)-O'_{actual}(k))$, and an adder 176 and an accumulator 178 generate the sum of the weighted beam-velocity errors from $k=0 \rightarrow N-1$. The calculator 104 then compares the sum of the weighted beam-velocity errors to a predetermined beam velocity (comparator not shown in FIG. 18). If the sum of the weighted beam-velocity errors is less than the predetermined threshold, then the calculator 104 halts the tuning of $\omega_{bestimate}$. But if the sum of the weighted beam-velocity errors is greater than or equal to the predetermined threshold, then a multiplier 180 generates b equal to the product of the sum of the weighted beam-velocity errors and scale_b, and an adder 182 generates the new estimated coefficient $\omega_{bestimatenew}$ equal to the sum of b and the current estimated coefficient $\omega_{bestimate}$. The channel 152 then stores $\omega_{bestimatenew}$ in the coefficient table 110 in place of $\omega_{bestimate}$. Consequently, $\omega_{bestimatenew}$ becomes the new current estimated coefficient $\omega_{bestimate}$.

In addition, referring to the channel 154, an adder 184 generates the beam-position error $O_{target}(k) - O_{actual}(k)$. A multiplier 186 generates the weighted beam-position error $w_c(k)(O_{target}(k) - O_{actual}(k))$, and an adder 188 and an accumulator 190 generate the sum of the weighted beam-position errors from k=0→N−1. The calculator 104 then compares the sum of the weighted beam-position errors to a predetermined beam-position threshold (comparator not shown in FIG. 18). If the sum of the weighted beam-position errors is less than the predetermined threshold, then the calculator 104 halts the tuning of $\omega_0{}^2{}_{estimate}$. But if the sum of the weighted beam-position errors is greater than or equal to the predetermined threshold, then a multiplier 192 generates c equal to the product of the sum of the weighted error differences and scale_c, and an adder 194 generates the new estimated coefficient $\omega_0{}^2{}_{estimatenew}$ equal to the sum of c and the current estimated coefficient $\omega_0{}^2{}_{estimate}$. The channel 154 then stores $\omega_0{}^2{}_{estimatenew}$ in the coefficient table 110 in place of $\omega_0{}^2{}_{estimate}$. Consequently, $\omega_0{}^2{}_{estimatenew}$ becomes the new current estimated coefficient $\omega_0{}^2{}_{estimate}$.

Referring to FIGS. 16-18, each channel 150, 152, and 154 of the differential-equation-coefficient calculator 104 repeats the above steps and the drive-signal generator 108 generates new values for D(k) based on the new values of $1/g_{estimate}$, $w_{0estimate}$, and $w_0{}^2{}_{estimate}$ until the error sums from the accumulators 164, 178, and 190 are each less than their respective predetermined error threshold. Therefore, the calibrator 102 may independently halt operation of the channels 150, 152, and 154. That is, the calibrator 102 may halt operation of one channel before the others if one error sum falls below its respective threshold before the other error sums fall below their respective thresholds.

After the calibrator 102 halts operation of all the channels 150, 152, and 154 of the differential-equation-coefficient calculator 104, the values of $1/g_{estimate}$, $\omega_{bestimate}$, and $\omega_0{}^2{}_{estimate}$ currently stored in the table 110 are the tuned coefficients.

Then, referring to FIG. 17, the drive-signal generator 108 generates from the tuned coefficients $1/g_{estimate}$, $\omega_{bestimate}$ and $\omega_0{}^2{}_{estimate}$ stored in the table 110 the values of D(k) for k=0→N−1 as discussed above, and loads these values of D(k) into the table 52.

Referring again to FIGS. 16-18, alternate embodiments of the calibrating mode are contemplated.

For example, to distribute the processing load where one or more processors implement the calibrator 102, the drive-signal generator 108, or portions thereof, the calibrator 102 tune only one estimated coefficient $1/g_{estimate}$, $\omega_{bestimate}$, or $\omega_0{}^2{}_{estimate}$ at a time. For example, the differential-equation-coefficient calculator 104 may first cause the channel 150 to execute the above-described routine to tune $1/g_{estimate}$, next cause the channel 152 to execute the above-described routine to tune $\omega_{bestimate}$, and then cause the channel 154 to execute the above-described routine to tune $\omega_0{}^2{}_{estimate}$.

In addition, instead of comparing the unscaled sums of the errors from the accumulators 164, 178, and 190 to the respective thresholds, the differential-equation-coefficient calculator 104 may compare the scaled sums a, b and c from the multipliers 166, 180, and 192 to respective thresholds, or may compare the differences between the new and current coefficients ($1/g_{estimatenew} - 1/g_{estimate}$, $\omega_{bestimatenew} - \omega_{bestimate}$, and $\omega_0{}^2{}_{estimatenew} - \omega_0{}^2{}_{estimate}$) to respective thresholds to determine when to halt the tuning of each coefficient.

Furthermore, the calibrator 102 may use the threshold detector 66 in the calibrating mode as discussed below.

Image-Scanning Mode

Referring to FIGS. 14 and 16-18, the image-scanning system 100 operates in the image-scanning mode while it is scanning an image (not shown).

During this mode, the drive-signal generator 108 generates the drive signal D from the values D(k) stored in the table 52 of the memory 109. Specifically, the generator 108 sequentially clocks the values D(k) out of the table 52, through the multiplexer 138, and to the DAC 53, which generates the analog drive signal D as discussed above.

Furthermore, the threshold detector 66 monitors the actual output response $O_{actual}$ of the reflector 12 and causes the calibrator 102 to retune the coefficients of D if and when $O_{actual}$ drifts more than a predetermined "distance" away from the target output response $O_{target}$. Specifically, the threshold detector 66 measures and compares one or more characteristics of the actual output response $O_{actual}$ with threshold values for these characteristics as discussed above in conjunction with the system 40 of FIG. 11. For example, the detector 66 may measure the velocity ripple during the beam-sweep period $T_{sweep}$ (FIG. 2) of $O_{actual}$ and compare the velocity ripple to a predetermined threshold value as discussed above in conjunction with the system 40. Based on the relationship between the measured characteristic(s) and corresponding threshold value(s), the detector 66 determines whether $O_{actual}$ is satisfactory. If $O_{actual}$ is unsatisfactory, then the detector 66 generates an active logic level for the signal CALIBRATE, which causes the system 100 to enter the recalibrating mode as discussed below.

Alternative embodiments of the image-scanning mode are contemplated. For example, the threshold detector 66 may be omitted, and the calibrator 102 may operate in a manner similar to that described above in conjunction with the calibrating mode, and continually tune the estimated coefficients $1/g_{estimate}$, $\omega_{bestimate}$, and $\omega_0{}^2{}_{estimate}$ as needed.

Recalibrating Mode

Still referring to FIGS. 14 and 16-18, the system 100 enters the recalibrating mode in response to the threshold detector 66 generating an active logic level for the signal CALIBRATE as discussed above.

In response to an active logic level for CALIBRATE, the calibrator 102 first attempts to retune the estimated coefficients $1/g_{estimate}$, $\omega_{bestimate}$, and $\omega_0{}^2{}_{estimate}$ of D in the manner discussed above in conjunction with the calibrating mode. To prevent the calibrator 102 from entering an infinite execution loop where the sums of the weighted errors from the accumulators 164, 178, and 190 do not converge to meet their respective threshold requirements, the calibrator 102 executes the calibrating routine for each estimated coefficient $1/g_{estimate}$, $\omega_{bestimate}$, and $\omega_0{}^2{}_{estimate}$ for only a predetermined maximum number of times, for example, ten times.

If, after the calibrator 102 executes the coefficient calibrating routine at least once but no more than the predetermined maximum number of times, the weighted errors from the accumulators 164, 178, and 190 meet their respective threshold requirements, then the calibrator 102 halts the recalibrating as discussed above in conjunction with the calibrating mode, and performs no further recalibrating until the threshold detector 66 indicates that recalibrating should be performed.

Alternatively, the calibrator 102 may execute the coefficient calibrating routine until the threshold detector 66 indicates that $O_{actual}$ meets the threshold requirement imposed by the threshold detector, presuming that the calibrator does not execute the routine more than the predetermined number of times.

But if, after the calibrator 102 executes the coefficient calibration routine at least once but no more than the predetermined maximum number of times, the weighted errors from the accumulators 164, 178, and 190 do not meet their respective threshold requirements, then the calibrator determines whether the characteristic (such as velocity ripple) measured by the threshold detector 66 is within the threshold requirement imposed by the threshold detector. If the characteristic is within the threshold requirement, then the calibrator 102 uses the system 100 to exit the recalibrating mode. But if the characteristic is not within the threshold requirement, then the calibrator 102 replaces the original threshold with the newly measured threshold plus a predetermined cushion. For example, the characteristic measured by the threshold detector 66 may be velocity ripple as discussed above in conjunction with the recalibrating mode of the system 40 of FIG. 11.

The calibrator 102 enters the recalibrating mode and executes the recalibrating procedure whenever the threshold detector 66 detects that the actual output response $O_{actual}$ of the reflector 12 (FIG. 1) is more than a predetermined "distance" away from the target output response $O_{target}$ outside of the predetermined specification.

Alternate Embodiment of the Calibrating Mode Using the Threshold Detector 66

Instead of comparing the sums of the weighted errors from the accumulators 164, 178, and 190 to respective predetermined thresholds, the differential-equation-coefficient calculator 104 may execute the calibrating routine discussed above until $O_{actual}$ meets the threshold requirement imposed by the threshold detector 66 in a manner similar to that discussed above in conjunction with the alternate calibrating-mode embodiment for the system 40 of FIG. 11.

Figure 19:
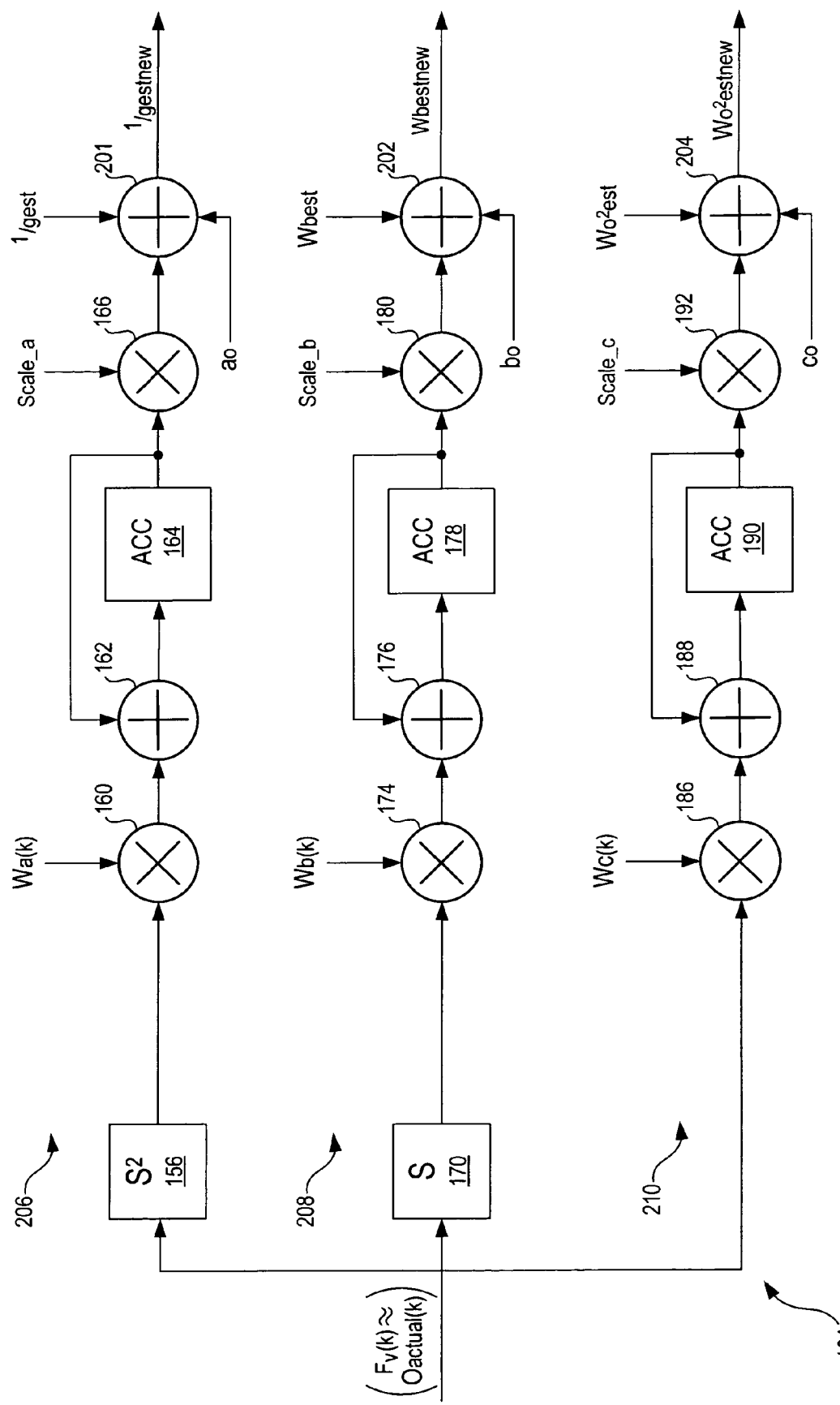
FIG. 19 is a functional block diagram of the coefficient calculator of FIGS. 14 and 16 according to another embodiment.

First Alternate Embodiment of the Differential-Equation Coefficient Calculator FIG. 19 is a functional block diagram of a differential-equation-coefficient calculator 200 that can replace the differential-equation-coefficient calculator 104 of FIGS. 14, 16, and 18 according to a first alternate embodiment of the invention. One major difference between the coefficient calculators 104 and 200 that the coefficient calculator 200 lacks the summers 158, 172, and 184 of the calculator 104.

More specifically, one can rewrite equation (37) as follows:

$$a = \sum_{k=0}^{N-1} [\text{scale\_a}] wa[k] O\text{"actual}(kT/(N-1)) - \tag{40}$$

-continued $$\sum_{k=0}^{N-1} [\text{scale\_a}] wa[k] O\text{"target}(kT/(N-1))$$

$$= \sum_{k=0}^{N-1} [\text{scale\_a}] wa[k] O\text{"actual}(kT/(N-1)) - a_0$$

where $a_0$ is a known constant. Therefore, one can calculate $a_0$, store $a_0$ in the memory 109, and then provide it as an input to the adder 201, which generates $1/g_{estimatenew}$. Similarly, one can rewrite equations (38) and (39) with known constants $b_0$ and $c_0$, which one can calculate, store in the memory 109, and provide as inputs to the adders 202 and 204 to generate $\omega_{bestimatenew}$ and $\omega_0^2{}_{estimatenew}$, respectively. Consequently, the differential-equation-coefficient calculator 200 is less complex than the calculator 104 of FIG. 18 and typically has a lower latency because one pipeline stage (the adders 158, 172, and 184 of FIG. 18) is omitted from each channel 206, 208, and 210.

Second Alternate Embodiment of the Differential-Equation Coefficient Calculator 104

Figure 20:
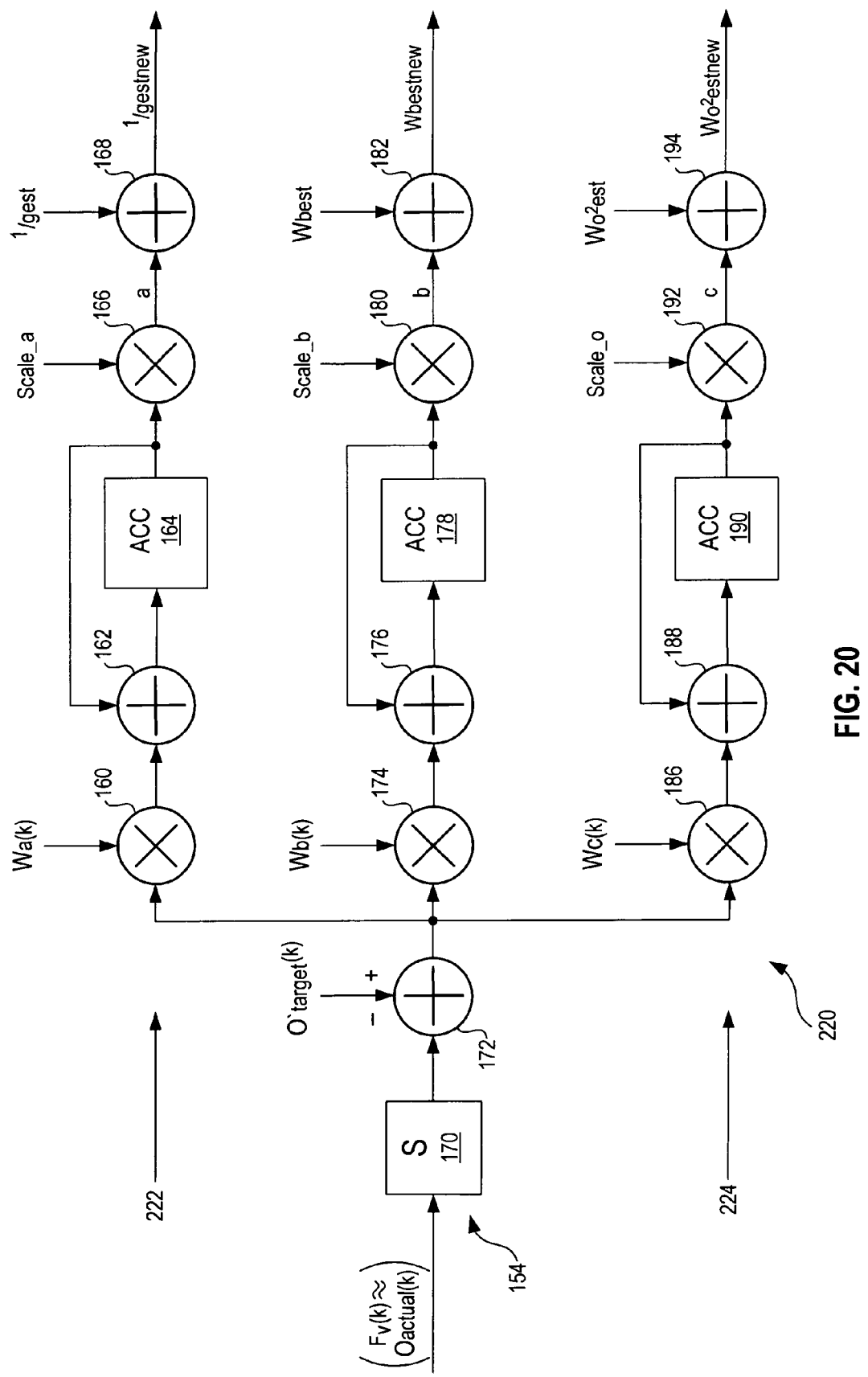
FIG. 20 is a functional block diagram of the coefficient calculator of FIGS. 14 and 16 according to yet another embodiment.

FIG. 20 is a functional block diagram of a differential-equation-coefficient calculator 220 that can replace the differential-equation-coefficient calculator 104 of FIGS. 14, 16, and 18 according to a second alternate embodiment of the invention. One major difference between the coefficient calculators 104 and 220 is that the coefficient calculator 220 lacks the derivative block 156 and the summers 158 and 174 of the coefficient calculator 104. Consequently, the coefficient calculator 220 is less complex than the coefficient calculator 104.

Referring to FIG. 20, it has been found that maintaining the actual velocity $O'_{actual}$ of the reflector 12 (FIG. 1) within a predetermined "distance" from the target velocity $O'_{target}$ particularly during $T_{sweep}$ does more to prevent visible image artifacts than maintaining $O''_{actual}$ and $O_{actual}$ within respective predetermined "distances" from $O''_{target}$ and $O_{target}$. Therefore, the coefficient calculator 220 calculates all of the error values a, b, and c proportional to the difference $O'_{target} - O'_{actual}$, according to the following equations:

$$a = \sum_{k=0}^{N-1} [\text{scale\_a}] w_a[k] (O'_{target}(kT/(N-1)) - O'_{actual}(kT/(N-1))) \tag{41}$$

$$b = \sum_{k=0}^{N-1} [\text{scale\_b}] w_b[k] (O'_{target}(kT/(N-1)) - O'_{actual}(kT/(N-1))) \tag{42}$$

$$c = \sum_{k=0}^{N-1} [\text{scale\_c}] w_c[k] (O'_{target}(kT/(N-1)) - O'_{actual}(kT/(N-1))) \tag{43}$$

where $w_a[k]$ and $w_c[k]$ may have different values than for the coefficient calculator 104 to account for the changes in equations (41) and (43) relative to equations (37) and (39), respectively (equation (42) is the same as equation (38)). One may further reduce the complexity of the coefficient calculator 220 by calculating and storing in the memory 109 constants $a_0$, $b_0$, and $c_0$ from equations (41), (42), and (43) and eliminate the adder 172 from the channel 154.

Figure 21:
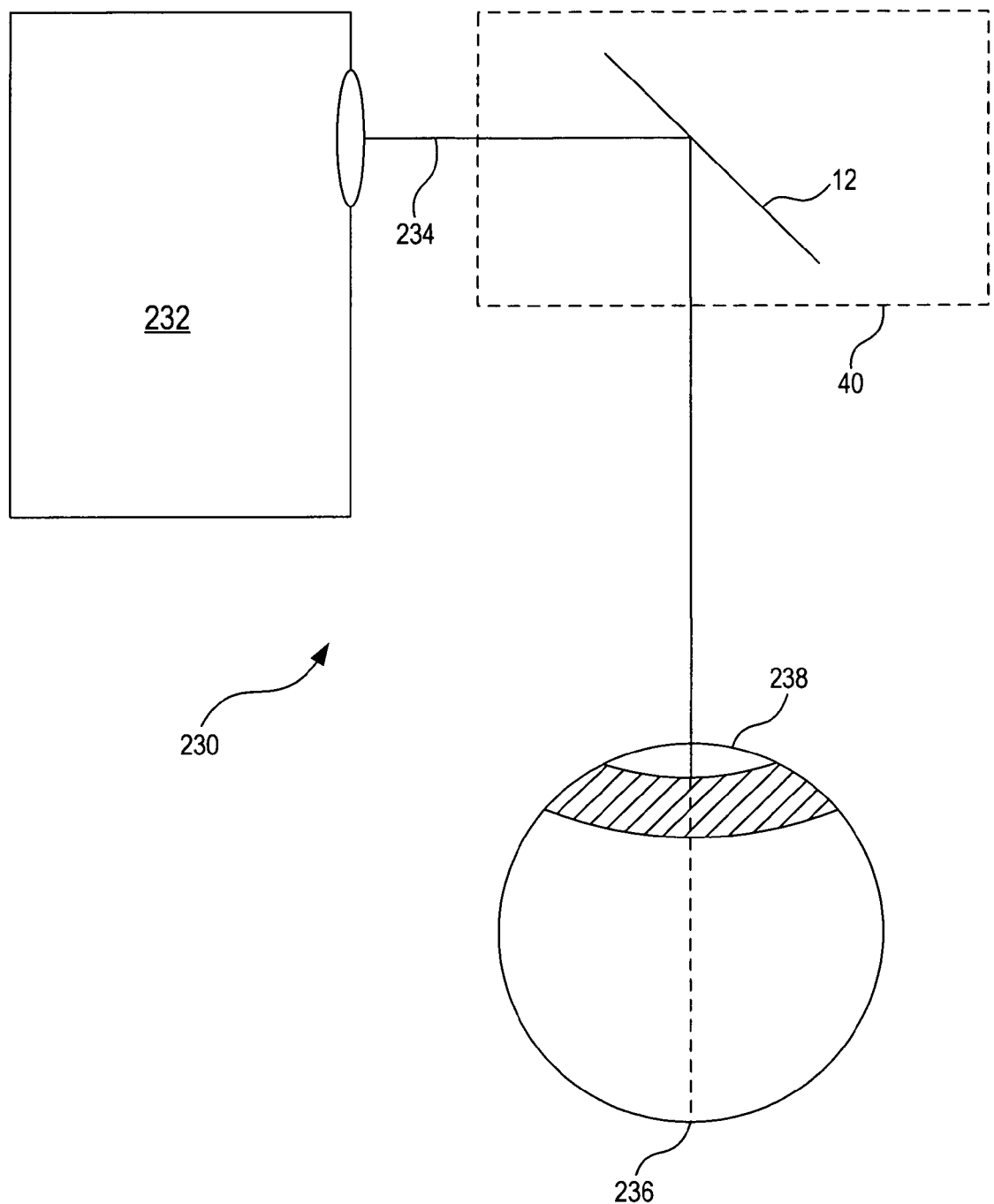
FIG. 21 is a functional block diagram of an imaging system that incorporates an image-scanning system such as the systems of FIG. 11 and FIG. 14 according to an embodiment.

FIG. 21 is a diagram of a virtual-retinal display (VRD) system 230 that incorporates the image-scanning system 40 of FIG. 11 or the image-scanning system 100 of FIG. 14 according to an embodiment of the invention. For purposes of illustration, FIG. 21 shows the system 230 incorporating the system 40 of FIG. 11. In addition to the system 40, the system 230 includes a conventional beam generator 232 for generating the image beam 22. The reflector 12 is operable to sweep the image beam 22 across a display screen or surface such as a retina 236 to generate an image thereon.

In operation, the beam generator 232 directs the image beam 22 onto the reflector 12. The reflector 12 sweeps the beam 22 through a pupil 238 and across the retina 236 by rotating back and forth as discussed above in conjunction with FIG. 1.

Figure 22:
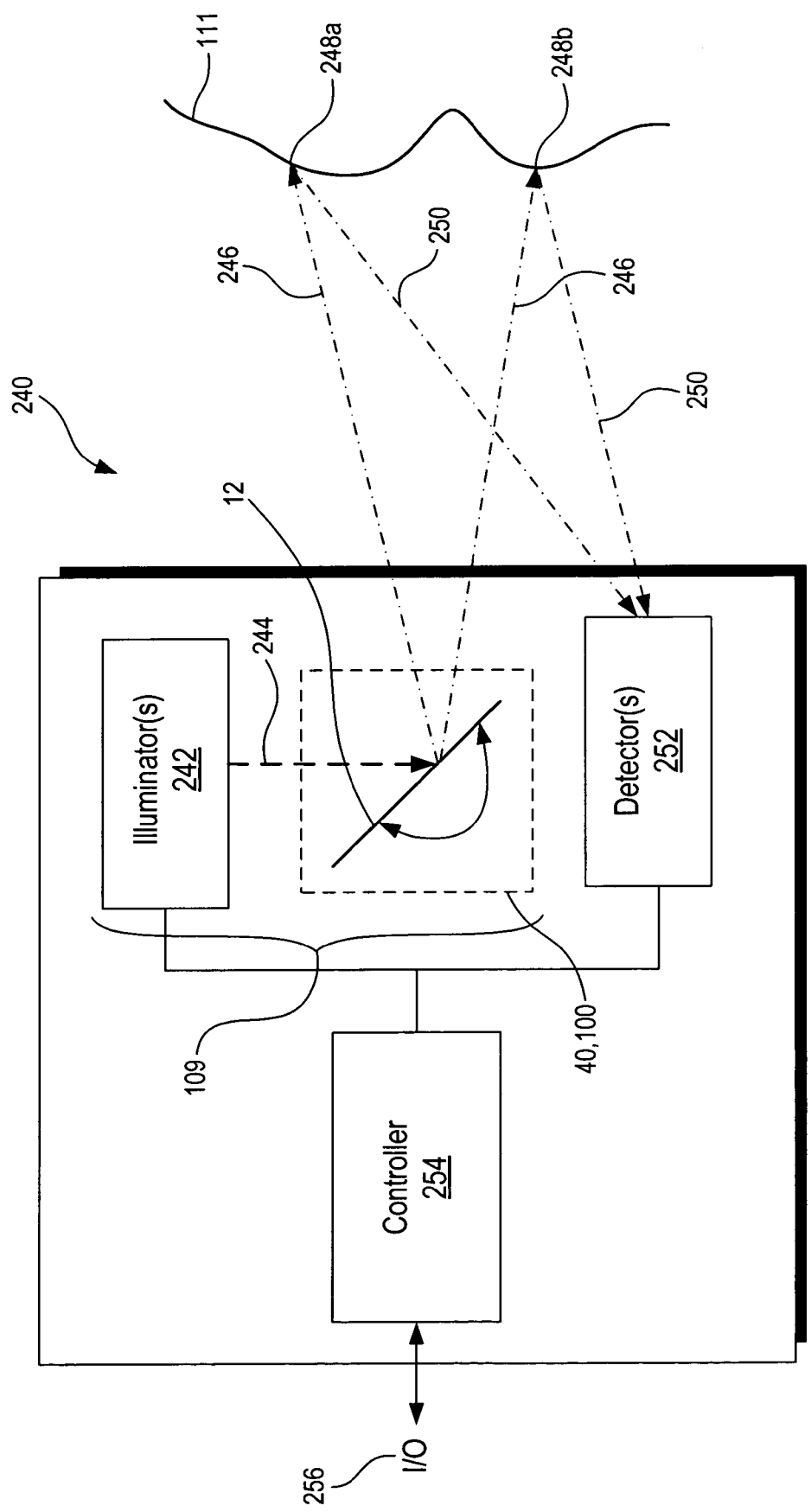
FIG. 22 is a functional block diagram of an imaging-capture system that incorporates an image-scanning system such as the systems of FIG. 11 and FIG. 14 according to an embodiment.

FIG. 22 is a block diagram of a scanned beam imager 240 that incorporates the image-scanning system 40 of FIG. 11 or the image-scanning system 100 of FIG. 14 according to an embodiment of the invention. An illuminator 242 creates a first beam of light 244. The scanning system 40, 100 deflects the first beam of light across a field-of-view (FOV) to produce a second scanned beam of light 246, shown in two positions 246a and 246b. The scanned beam of light 246 sequentially illuminates spots 248 in the FOV, shown as positions 248a and 248b, corresponding to beam positions 246a and 246b, respectively. While the beam 246 illuminates the spots 248, the illuminating light beam 250 is reflected, absorbed, scattered, refracted, or otherwise affected by the properties of the object or material to produced scattered light energy. A portion of the scattered light energy 250, shown emanating from spot positions 248a and 248b as scattered energy rays 250a and 250b, respectively, travels to one or more detectors 252 that receive the light and produce electrical signals corresponding to the amount of light energy received. The electrical signals drive a controller 254 that builds up a digital image and transmits it for further processing, decoding, archiving, printing, display, or other treatment or use via interface 256.

Light source 242 may include multiple emitters such as, for instance, light emitting diodes (LEDs), lasers, thermal sources, arc sources, fluorescent sources, gas discharge sources, or other types of illuminators. In some embodiments, illuminator 242 comprises a red laser diode having a wavelength of approximately 635 to 670 nanometers (nm). In another embodiment, illuminator 242 comprises three lasers; a red diode laser, a green diode-pumped solid state (DPSS) laser, and a blue DPSS laser at approximately 635 nm, 532 nm, and 473 nm, respectively. While laser diodes may be directly modulated, DPSS lasers generally require external modulation such as an acousto-optic modulator (AOM) for instance. In the case where an external modulator is used, it is considered part of light source 242. Light source 242 may include, in the case of multiple emitters, beam combining optics to combine some or all of the emitters into a single beam. Light source 242 may also include beam-shaping optics such as one or more collimating lenses and/or apertures. Additionally, while the wavelengths described in the previous embodiments have been in the optically visible range, other wavelengths may be within the scope of the invention.

Light beam 244, while illustrated as a single beam, may comprise a plurality of beams converging on a single scanner reflector 12 or onto separate scanners 12.

A 2D MEMS or other scanner 12 scans one or more light beams at high speed in a pattern that covers an entire 2D FOV or a selected region of a 2D FOV within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern so as to create a progressive scan pattern. A progressively scanned bi-directional approach with a single beam scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal and vertical scan may be driven magnetically or capacitively. Electrostatic driving may include electrostatic plates, comb drives or similar approaches. In various embodiments, both axes may be driven sinusoidally or resonantly.

Several types of detectors may be appropriate, depending upon the application or configuration. For example, in one embodiment, the detector may include a simple PIN photodiode connected to an amplifier and digitizer. In this configuration, beam position information may be retrieved from the scanner or, alternatively, from optical mechanisms, and image resolution is determined by the size and shape of scanning spot 248. In the case of multi-color imaging, the detector 252 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, simple photodetectors such as PIN photodiodes, APDs, and PMTs may be arranged to stare at the entire FOV, stare at a portion of the FOV, collect light retrocollectively, or collect light confocally, depending upon the application. In some embodiments, the photodetector 116 collects light through filters to eliminate much of the ambient light.

The present device may be embodied as monochrome, as full-color, and even as a hyper-spectral. In some embodiments, it may also be desirable to add color channels between the conventional RGB channels used for many color cameras. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels), may be applied universally to all channels, or may be applied to a subset of the channels.

In some embodiments, the illuminator may emit a polarized beam of light or a separate polarizer (not shown) may be used to polarize the beam. In such cases, the detector 252 may include a polarizer cross-polarized to the scanning beam 246. Such an arrangement may help to improve image quality by reducing the impact of specular reflections on the image.

From the foregoing it will be appreciated that, although specific embodiments of the invention have been described herein for purposes of illustration, various modifications may be made without deviating from the spirit and scope of the invention.

What is claimed is:

1. A device for driving a beam scanner, the device comprising:

a memory operable to store data corresponding to a drive signal;

a generator coupled to the memory and operable to generate the drive signal from the data and to couple the drive signal to the beam scanner; and a calibrator operable to measure a response of the beam scanner to the drive signal, calculate a difference between the measured response and a corresponding target response, and reduce the difference by altering the drive signal;

wherein the drive signal comprises a periodic drive signal and the data comprises phase and magnitude coefficients for harmonics of the periodic drive signal.

2. The device of claim 1 wherein one of the generator and calibrator comprises an electronic circuit that does not execute programming instructions.

3. The device of claim 1 wherein one of the generator and calibrator comprises a processor that executes programming instructions.

4. The device of claim 1 wherein the data comprises amplitudes of the drive signal at respective discrete time intervals.

5. The device of claim 1 wherein:
the data comprises amplitudes of the drive signal at respective discrete time intervals; and
the generator comprises a digital-to-analog converter that is operable to generate the drive signal from the amplitudes.

6. The device of claim 1 wherein:
the drive signal comprises a periodic drive signal;
the data comprises magnitude and phase coefficients for harmonics of the periodic drive signal; and
the generator, is operable to generate from the magnitude and phase coefficients a respective sinusoid for each of the harmonics, is operable to generate amplitude values of the drive signal, each amplitude value equal to the sum of the sinusoids at a respective discrete time interval, and comprises a digital-to-analog converter that is operable to generate the drive signal from the amplitude values.

7. The device of claim 1 wherein:
the data comprises samples of the target response and a coefficient of a polynomial equation that represents the beam scanner;
the generator is operable to generate amplitude values of the drive signal at respective discrete time intervals by mathematically combining the samples of the target response and the coefficient; and
the generator comprises a digital-to-analog converter that is operable to generate the drive signal from the amplitude values of the drive signal.

8. The device of claim 1 wherein the calibrator is operable to reduce the difference between the measured response and the target response by altering the data stored in the memory.

9. The device of claim 1 wherein the calibrator is operable to measure the response of the beam scanner, to calculate the difference between the measured response and a corresponding target response, and to reduce the difference until the difference is less than a predetermined threshold.

10. The device of claim 1 wherein:
the drive signal comprises a periodic drive signal;
the data comprises respective magnitude and phase coefficients for harmonics of the periodic drive signal; and
the calibrator is operable to, measure respective magnitude and phase coefficients for harmonics of the beam-scanner response, calculate respective differences between the measured magnitude and phase coefficients and target magnitude and phase coefficients, and reduce the differences by altering the magnitude and phase coefficients for the harmonics of the periodic drive signal.

11. The device of claim 1 wherein:
the data comprises values that respectively correspond to sampling intervals of the target response and a coefficient of a polynomial equation that represents the beam scanner; and
the calibrator is operable to calculate a difference between the response of the beam scanner and the target response and to reduce the difference by altering the coefficient.

12. A system, comprising:
a beam scanner operable to respond to a drive signal;
a memory operable to store data corresponding to the drive signal;
a generator coupled to the memory and operable to generate the drive signal from the data; and
a calibrator operable to measure the response of the beam scanner to the drive signal, calculate a difference between the measured response and a corresponding target response, and reduce the difference by altering the drive signal;
wherein the drive signal comprises a periodic drive signal and the data comprises phase and magnitude coefficients for harmonics of the periodic drive signal.

13. The system of claim 12 wherein the beam scanner comprises a spring-mass beam scanner.

14. The system of claim 12 wherein the beam scanner comprises arms and a member that is attached to and operable to rotate back and forth about the arms.

15. The system of claim 12 wherein the beam scanner comprises a microelectromechanical reflector.

16. A method, comprising:
driving a beam scanner with a drive signal;
a memory storing data corresponding to the drive signal, wherein the drive signal comprises a periodic drive signal and the data comprises phase and magnitude coefficients for harmonics of the periodic drive signal;
determining a difference between a target response and a response of the beam scanner to the drive signal;
reducing the difference by altering the drive signal; and
driving the beam scanner in an open-loop configuration with the altered drive signal after reducing the difference.

17. The method of claim 16, further comprising:
generating the drive signal and the altered drive signal from stored data; and
wherein reducing the difference between the target response and the response of the beam scanner comprises altering the stored data.

18. The method of claim 16, further comprising generating the drive signal based on an estimate of a frequency response of the beam scanner before altering the drive signal.

19. The method of claim 16, further comprising:
generating the drive signal by combining harmonics of the target response, each of the harmonics having a respective phase and a respective magnitude; and
wherein altering the drive signal comprises altering the phase or magnitude of one of the harmonics.

20. The method of claim 16, further comprising:
generating the drive signal by combining values respectively associated with sample intervals of the target response and a coefficient of a polynomial equation that represents a frequency response of the beam scanner; and
wherein altering the drive signal comprises altering the coefficient.

21. A method, comprising:
driving a beam scanner with a drive signal in an open-loop configuration;

a memory storing data corresponding to the drive signal, wherein the drive signal comprises a periodic drive signal and the data comprises phase and magnitude coefficients for harmonics of the periodic drive signal;

measuring a characteristic of a response of the beam scanner to the drive signal;

comparing the measured characteristic to a predetermined threshold;

if the measured characteristic has a first predetermined relationship to the threshold, then determining a difference between a target response and the response of the beam scanner to the drive signal; and reducing the difference by altering the drive signal.

22. The method of claim 21 wherein:

the beam scanner exhibits a velocity in response to the drive signal; and the characteristic of the beam scanner response comprises a standard deviation in the velocity.

23. The method of claim 21 wherein determining a difference between the target and beam scanner responses comprises determining a difference between a component of the target response and a component of the beam scanner response.

24. The method of claim 21 wherein determining a difference between the target and beam scanner responses comprises determining a difference between a derivative of the target response and a derivative of the beam scanner response.

25. The method of claim 21, further comprising:

generating the drive signal by combining target values that respectively correspond to sampling intervals of the target response and a coefficient of a polynomial equation that represents a frequency response of the beam scanner;

wherein determining a difference between the target response and the beam scanner response comprises, sampling the beam scanner response at the sampling intervals, generating beam scanner values that respectively correspond to the sampling intervals of the beam scanner response, and determining a respective difference between each target value and a corresponding beam scanner value; and altering the drive signal comprises altering the coefficient based on the differences between the target and beam scanner values.

26. The method of claim 21, further comprising:

generating the drive signal by combining values that respectively correspond to sampling intervals of the target response and a coefficient of a polynomial equation that represents a frequency response of the beam scanner;

wherein determining a difference between the target and beam scanner responses comprises, sampling the beam scanner response at the sampling intervals, generating beam scanner values that respectively correspond to the sampling intervals, determining a respective difference between each target value and corresponding beam scanner value, and weighting the differences; and altering the drive signal comprises altering the coefficient based on the weighted differences between the target and beam scanner values.

27. The method of claim 21, further comprising:

re-measuring the characteristic after reducing the difference between the target and system responses;

comparing the re-measured characteristic to the predetermined threshold; and if the re-measured characteristic has a second predetermined relationship to the threshold, then setting the threshold to another value based on the re-measured characteristic.

* * * * *